(12) United States Patent
Onishi et al.

(10) Patent No.: US 10,704,823 B2
(45) Date of Patent: Jul. 7, 2020

(54) VEHICLE HEAT MANAGEMENT DEVICE

(71) Applicant: TOYOTA JIDOSHA KABUSHIKI KAISHA, Toyota-shi, Aichi-ken (JP)

(72) Inventors: Yoichi Onishi, Okazaki (JP); Keisuke Shibata, Miyoshi (JP); Nobuharu Kakehashi, Toyoake (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 169 days.

(21) Appl. No.: 15/868,221

(22) Filed: Jan. 11, 2018

(65) Prior Publication Data

US 2018/0259240 A1 Sep. 13, 2018

(30) Foreign Application Priority Data

Mar. 13, 2017 (JP) ................................ 2017-047736

(51) Int. Cl.
| | |
|---|---|
| *F25D 21/00* | (2006.01) |
| *F25D 21/12* | (2006.01) |
| *F25D 21/02* | (2006.01) |
| *B60H 1/04* | (2006.01) |
| *F25B 47/00* | (2006.01) |

(Continued)

(52) U.S. Cl.
CPC ....... *F25D 21/006* (2013.01); *B60H 1/00921* (2013.01); *B60H 1/04* (2013.01); *B60H 1/32281* (2019.05); *F25B 25/005* (2013.01); *F25B 41/043* (2013.01); *F25B 47/006* (2013.01); *F25B 47/02* (2013.01); *F25D 21/02* (2013.01); *F25D 21/125* (2013.01); *B60H 2001/00928* (2013.01); *B60H 2001/00961* (2019.05); *F25B 2339/047* (2013.01); *F25B 2600/02* (2013.01);

(Continued)

(58) Field of Classification Search
CPC ...... F25D 21/006; F25D 21/02; F25D 21/125; F25B 41/043; F25B 25/005; F25B 47/02; F25B 47/006; B60H 1/32281; B60H 1/04; B60H 2001/00961; B60H 2001/00928
See application file for complete search history.

(56) References Cited

U.S. PATENT DOCUMENTS

| 2015/0115048 A1* | 4/2015 | Brodie | ............... | B60H 1/00764 237/2 B |
|---|---|---|---|---|
| 2015/0251518 A1* | 9/2015 | Nemesh | ............. | B60H 1/00485 165/202 |

(Continued)

FOREIGN PATENT DOCUMENTS

| JP | 2008-221997 A | 9/2008 |
|---|---|---|
| JP | 2017-128223 A | 7/2017 |

*Primary Examiner* — Larry L Furdge
(74) *Attorney, Agent, or Firm* — Oliff PLC

(57) ABSTRACT

A vehicle heat management device that includes: a pump that circulates cooling water around a cooling water circulation path; an air blower that blows air through a radiator toward an exterior heat exchanger of an air-conditioning device of a vehicle; and a de-icing controller that, in a case in which an estimated ice adhesion amount on the exterior heat exchanger is a predetermined value or greater, starts first de-icing control by using a pump to circulate cooling water in a flow path including a second flow path, in the state in which a first flow path and the second flow path are isolated from each other by a first switching section, and using the air blower to blow air through the radiator toward the exterior heat exchanger.

14 Claims, 17 Drawing Sheets

(51) Int. Cl.
　　　*B60H 1/00*　　　(2006.01)
　　　*F25B 47/02*　　　(2006.01)
　　　*F25B 25/00*　　　(2006.01)
　　　*F25B 41/04*　　　(2006.01)
　　　*B60H 1/32*　　　(2006.01)

(52) U.S. Cl.
　　　CPC . *F25B 2600/112* (2013.01); *F25B 2600/2513* (2013.01); *F25B 2600/2519* (2013.01)

(56) References Cited

U.S. PATENT DOCUMENTS

2016/0068043 A1* 3/2016 Djermester .............. B60H 1/03
　　　　　　　　　　　　　　　　　　　　　237/5
2016/0347150 A1* 12/2016 Kakade .............. B60H 1/00885

* cited by examiner

VEHICLE HEAT MANAGEMENT DEVICE

CROSS-REFERENCE TO RELATED APPLICATION

This application is based on and claims priority under 35 USC 119 from Japanese Patent Application No. 2017-047736 filed on Mar. 13, 2017, which is incorporated by reference herein.

BACKGROUND

Technical Field

The present invention relates to a vehicle heat management device.

Related Art

Japanese Patent Application Laid-Open (JP-A) No. 2008-221997 describes a vehicle air-conditioning device that is installed in a hybrid vehicle and that heats using an exterior heat exchanger, a compressor, and an interior condenser to function as a heat pump. In this air-conditioning device, when ice adhesion on the exterior heat exchanger is detected while performing heating in a state in which the engine is stationary, the engine is started, an electric fan is rotated reversely, and a shutter at the vehicle front of the radiator is closed in order to perform de-icing using waste heat from the engine and radiator.

As described above, in the technology of JP-A No. 2008-221997, when ice adhesion on the exterior heat exchanger is detected while performing heating in a state in which the engine is stationary, the engine is started and waste heat from the engine is used to de-ice the exterior heat exchanger. However, although the engine is originally intended for use as a heat engine in which energy obtained by burning fuel is converted into motive power, the technology of JP-A No. 2008-221997 does not utilize the motive power obtained from the engine when de-icing the exterior heat exchanger. The technology of JP-A No. 2008-221997 therefore exhibits poor energy utilization efficiency when de-icing the exterior heat exchanger, leaving room for improvement.

SUMMARY

An object of the present disclosure is to suppress a drop in the energy utilization efficiency when de-icing an exterior heat exchanger.

A vehicle heat management device of an aspect includes a first switching section, a pump, an air blower, and a de-icing controller. In a cooling water circulation path including a first flow path passing a heat generating body of a vehicle, and a second flow path passing a radiator and not passing the heat generating body, the first switching section is capable of switching between a state in which the first flow path and the second flow path are in communication with each other and a state in which the first flow path and the second flow path are isolated from each other. The pump circulates cooling water around the cooling water circulation path. The air blower blows air through the radiator toward an exterior heat exchanger of an air-conditioning device of the vehicle. In cases in which an estimated ice adhesion amount on the exterior heat exchanger is a predetermined value or greater, the de-icing controller starts first de-icing control by using the pump to circulate cooling water in a flow path including the second flow path in a state in which the first flow path and the second flow path are isolated from each other by the first switching section, and using the air blower to blow air through the radiator toward the exterior heat exchanger.

DESCRIPTION OF EMBODIMENTS

Detailed explanation follows regarding examples of exemplary embodiments of the present invention, with reference to the drawings.

First Exemplary Embodiment

Figure 1:
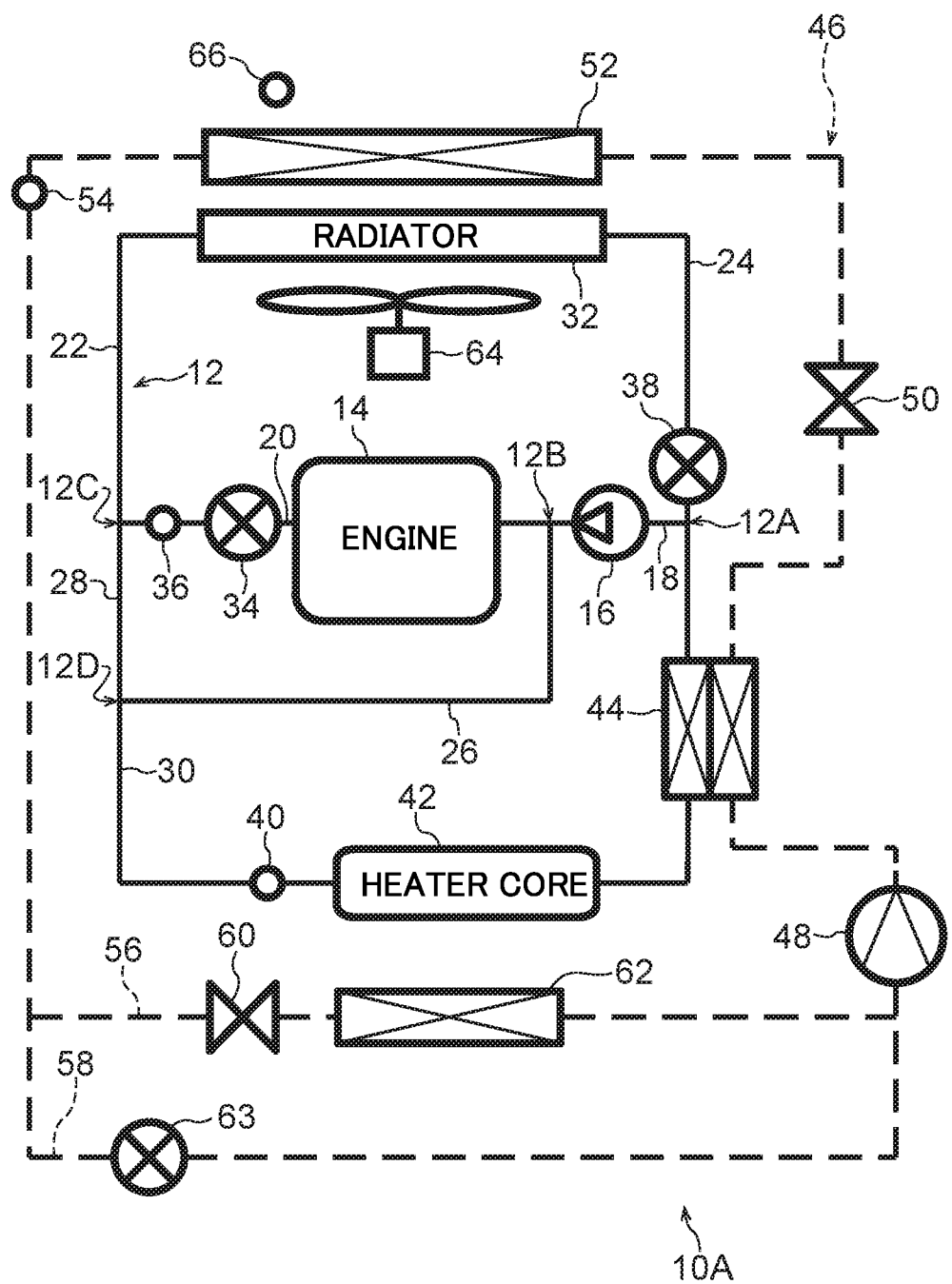
FIG. 1 is a schematic configuration diagram of a vehicle heat management system according to a first exemplary embodiment.

FIG. 1 illustrates a vehicle heat management system 10A according to a first exemplary embodiment. The vehicle heat management system 10A includes a cooling device that cools an engine 14, this being an example of a heat generating body of a vehicle, by circulating cooling water around a cooling water circulation path 12, and an air-conditioning device that air-conditions the interior of a vehicle cabin of the vehicle by circulating a heat exchange medium around a heat exchange medium circulation path 46. Note that in FIG. 1, the cooling water circulation path 12 is illustrated by solid lines, and the heat exchange medium circulation path 46 is illustrated by dashed lines.

The cooling water circulation path 12 is provided with a water pump (referred to below as "WP") 16, this being an example of a pump to circulate the cooling water around the cooling water circulation path 12 to cool the engine 14. The WP 16 may be a mechanical WP actuated using the engine 14 as a drive source, or may be an electric WP actuated using a motor as a drive source. In the present exemplary embodiment, explanation is given regarding a configuration in which an electric WP is applied as the WP 16.

One end of the WP 16 is positioned at a connection point 12A of the cooling water circulation path 12, and the other end of the WP 16 is provided partway along a pipe 18, positioned at a connection point 12B. At the connection point 12B on a cooling water exit side of the WP 16, the other end of the pipe 18 is connected to both one end of a pipe 20 and one end of a pipe 26.

The other end of the pipe 20 is positioned at a connection point 12C. The engine 14, a first solenoid valve 34, serving as an example of a first switching section of the present invention, and a first water temperature sensor 36 are provided in sequence along the pipe 20. Cooling water flowing through the pipe 20 passes through a water jacket of the engine 14, receiving heat from the engine 14 and thus cooling the engine 14. The first solenoid valve 34 can be opened and closed. Cooling water flows inside the pipe 20 when the first solenoid valve 34 is in an open state, and the cooling water is stopped from flowing through the pipe 20 when the first solenoid valve 34 is in a closed state.

The other end of the pipe 20 is connected to both one end of a pipe 22 and one end of a pipe 28 at the connection point 12C. The other end of the pipe 22 is connected to a radiator 32, and one end of a pipe 24, of which the other end is positioned at the connection point 12A, is also connected to the radiator 32. A second solenoid valve 38 is provided partway along the pipe 24. The other end of the pipe 24 is connected to both the one end of the pipe 18 and the one end of a pipe 30 at the connection point 12A. Cooling water that has flowed into the radiator 32 via the pipe 22 releases heat by passing through the radiator 32, before flowing through the pipe 24, the connection point 12A, and the pipe 18 in sequence and being drawn into the WP 16.

The other end of the pipe 26 is connected to both the other end of the pipe 28 and the other end of the pipe 30, at a connection point 12D. A second water temperature sensor 40, this being an example of a water temperature detection section, a heater core 42, and a heat exchanger 44 that performs heat exchange with the heat exchange medium circulating around the heat exchange medium circulation path 46, are provided along the pipe 30, in sequence from the connection point 12D side. The second water temperature sensor 40 is an example of a water temperature detection section of the present invention.

Note that in the cooling water circulation path 12 described above, the pipe 20 is an example of a "first flow path passing through the heat generating body of the vehicle" of the present invention, and the pipes 22, 24, 26, 28, 30 are an example of a "second flow path passing through the radiator and not passing through the heat generating body of the vehicle" of the present invention. The pipe 18 therefore configures a portion that is common to both the first flow path and the second flow path, and the cooling water circulation path 12 includes the pipe 20 that is an example of the first flow path and the pipes 22, 24, 26, 28, 30 that are an example of the second flow path. Of the pipes 22, 24, 26, 28, 30, the pipes 26, 28, 30 are examples of a first portion, and the pipes 22, 24 are examples of a second portion.

Next, explanation follows regarding the heat exchange medium circulation path 46 of the air-conditioning device. The heat exchange medium circulation path 46 is provided with a compressor 48 that compresses the heat exchange medium inside the heat exchange medium circulation path 46. The heat exchanger 44, an electric first expansion valve 50, an exterior heat exchanger 52, and a heat exchange medium temperature sensor 54 are provided in sequence from a heat exchange medium exit side of the compressor 48. The heat exchange medium circulation path 46 branches into two flow paths 56, 58 downstream of the heat exchange medium temperature sensor 54. An electric second expansion valve 60 and an evaporator 62 are provided in sequence partway along one of the flow paths 56. An solenoid valve 63 is provided partway along the other of the flow paths 58. Downstream of the evaporator 62, the flow path 56 is connected to the flow path 58 downstream of the solenoid valve 63, and is connected to the intake side of the compressor 48.

Moreover, the exterior heat exchanger 52 is disposed substantially parallel to the radiator 32, at the vehicle front of the radiator 32. An electric fan 64, serving as an example of an air blower of the present invention, is provided on the opposite side of the radiator 32 to the exterior heat exchanger 52. The electric fan 64 blows air toward the radiator 32 through the exterior heat exchanger 52 when rotated forward, and blows air toward the exterior heat exchanger 52 through the radiator 32 when rotated reversely. An ambient air temperature sensor 66 is disposed at the vehicle front of the exterior heat exchanger 52. The ambient air temperature sensor 66 is disposed at a position through which blown air passes when the electric fan 64 is rotated reversely so as to blow air toward the exterior heat exchanger 52 through the radiator 32.

Figure 2:
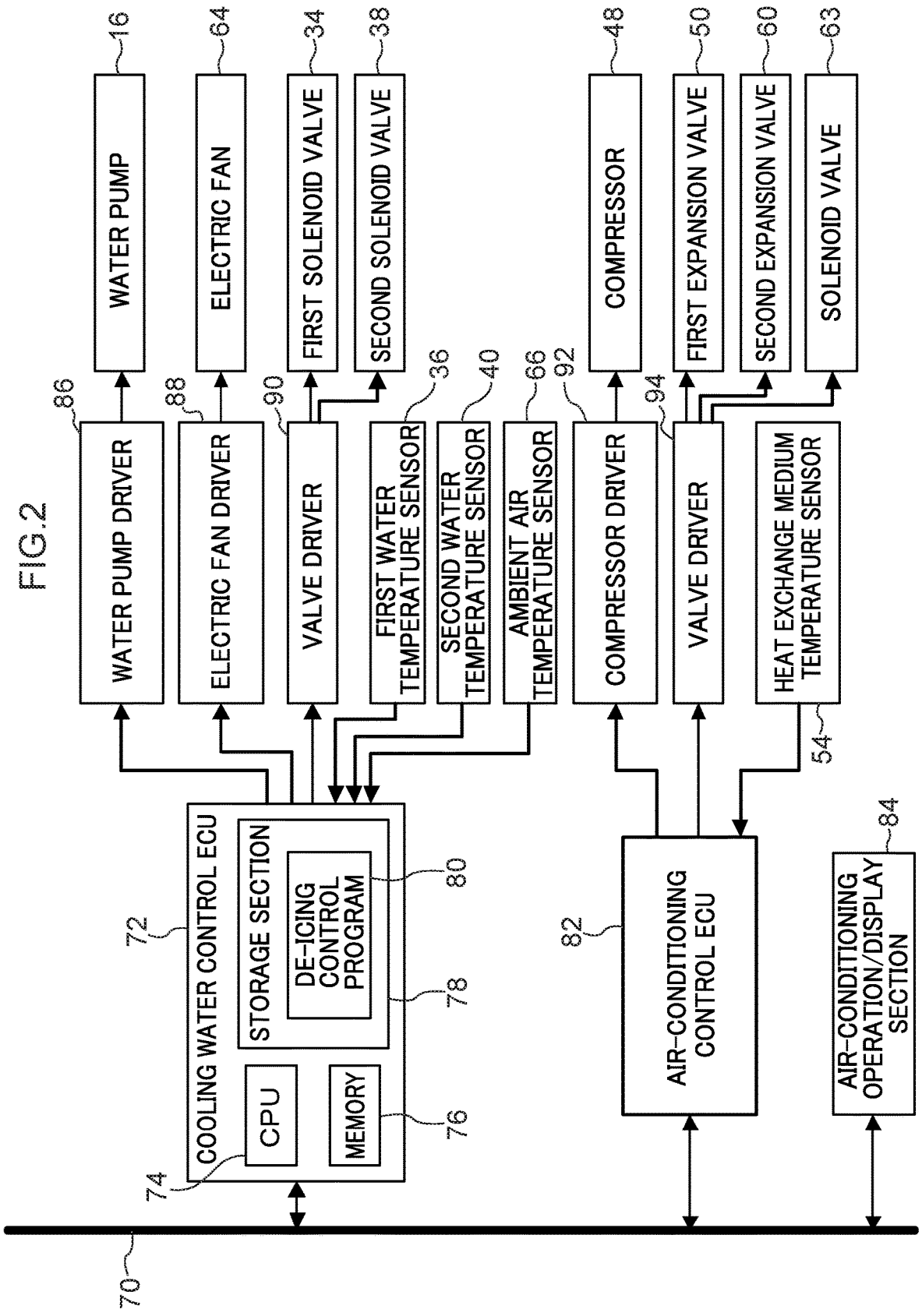
FIG. 2 is a schematic block diagram of sections of an in-vehicle system pertaining to a vehicle heat management system according to the first exemplary embodiment.

FIG. 2 illustrates sections pertaining to a vehicle heat management system in an in-vehicle system installed to a vehicle. The in-vehicle system is provided with a bus 70. The bus 70 connects together plural electronic control units and various devices. Each electronic control unit is a control unit including a CPU, memory, and a non-volatile storage section, and is referred to as an "ECU" below. Out of the plural ECUs, FIG. 2 illustrates a cooling water control ECU 72 configuring part of the cooling device and an air-conditioning control ECU 82 configuring part of the air-conditioning device, and out of the various devices, FIG. 2 illustrates an air-conditioning operation/display section 84 used by an occupant to check the state of the air-conditioning device and input instructions to the air-conditioning device.

The cooling water control ECU 72 includes a CPU 74, memory 76, and a non-volatile storage section 78 stored with a de-icing control program 80. The cooling water control ECU 72 reads the de-icing control program 80 from the storage section 78 and expands the de-icing control program 80 into the memory 76, and executes the de-icing control program 80 expanded into the memory 76 using the CPU 74 in order to perform de-icing control processing, described later. The cooling water control ECU 72 functions as an example of a de-icing controller of the present invention by performing the de-icing control processing, and together with the first solenoid valve 34, the WP 16, and the electric fan 64, functions as a vehicle heat management device according to the present invention.

The cooling water control ECU 72 is connected to a WP driver 86, an electric fan driver 88, a valve driver 90, the first water temperature sensor 36, the second water temperature sensor 40, and the ambient air temperature sensor 66. The WP driver 86 drives the WP 16 under instructions from the cooling water control ECU 72, and the electric fan driver 88 drives the electric fan 64 under instructions from the cooling water control ECU 72. The valve driver 90 opens and closes the first solenoid valve 34 and the second solenoid valve 38 under instructions from the cooling water control ECU 72.

The first water temperature sensor 36 detects a water temperature Tw1 of the cooling water in the pipe 20 (in the first flow path), and outputs the detection results to the cooling water control ECU 72. The second water temperature sensor 40 detects a water temperature Tw2 of the cooling water in the pipe 30 (in the second flow path), and outputs the detection results to the cooling water control ECU 72. The ambient air temperature sensor 66 detects an ambient air temperature Tamb, and outputs the detection results to the cooling water control ECU 72.

The air-conditioning control ECU 82 is connected to a compressor driver 92, a valve driver 94, and the heat exchange medium temperature sensor 54. The compressor driver 92 drives the compressor 48 under instructions from the air-conditioning control ECU 82. The valve driver 94 opens and closes the first expansion valve 50, the second expansion valve 60, and the solenoid valve 63 under instructions from the air-conditioning control ECU 82. The heat exchange medium temperature sensor 54 detects a heat exchange medium temperature Tr downstream of the exterior heat exchanger 52 in the heat exchange medium circulation path 46, and outputs the detection results to the air-conditioning control ECU 82.

Next, explanation follows regarding operation of the first exemplary embodiment, dealing first with actuation of the air-conditioning device.

Cooling Action of the Air-Conditioning Device

When an instruction to cool the vehicle cabin interior has been given by the vehicle occupant via the air-conditioning operation/display section 84, the air-conditioning control ECU 82 fully opens the first expansion valve 50 using the valve driver 94. The air-conditioning control ECU 82 also sets the second expansion valve 60 to a predetermined opening amount so as to supply the heat exchange medium to the evaporator 62 at a flow rate required for cooling, and fully closes the solenoid valve 63. The air-conditioning control ECU 82 also drives the compressor 48 using the compressor driver 92.

When driven, the compressor 48 draws in and compresses the heat exchange medium, and the high pressure compressed heat exchange medium releases heat while passing through the heat exchanger 44 (cooling water inside the heat exchanger 44 is heated), before passing through the fully opened first expansion valve 50. The heat exchange medium, still at high pressure, is supplied to the exterior heat exchanger 52. The heat exchange medium supplied to the exterior heat exchanger 52 becomes liquid as it releases heat while passing through the exterior heat exchanger 52, and then flows into the flow path 56 since the solenoid valve 63 is fully closed.

After flowing into the flow path 56, the heat exchange medium is decreased in pressure by the second expansion valve 60 and becomes low-pressure. The heat exchange medium then evaporates as it passes through the evaporator 62, thereby cooling air in the proximity of the evaporator 62. The cooled air is supplied into the vehicle cabin by a blower so as to cool the vehicle cabin interior. The heat exchange medium that has passed through the evaporator 62 is then drawn into the compressor 48 again.

Heating Action of the Air-Conditioning Device

When an instruction to heat the vehicle cabin interior has been given by the vehicle occupant via the air-conditioning operation/display section 84, the air-conditioning control ECU 82 performs control so as to perform heat pump operation. Namely, the air-conditioning control ECU 82 uses the valve driver 94 to open the first expansion valve 50 to a predetermined opening amount in order to reduce the pressure of the heat exchange medium, fully close the second expansion valve 60, and fully open the solenoid valve 63. The air-conditioning control ECU 82 then drives the compressor 48 using the compressor driver 92.

The compressor 48 draws in and compresses the heat exchange medium. The high pressure compressed heat exchange medium becomes liquid while releasing heat as it passes through the heat exchanger 44 (heating cooling water in the heat exchanger 44). The heat exchange medium is reduced in pressure by the first expansion valve 50, and the heat exchange medium is supplied to the exterior heat exchanger 52 in a low pressure state. The heat exchange medium supplied to the exterior heat exchanger 52 evaporates while passing through the exterior heat exchanger 52, thereby absorbing heat from air in the proximity of the exterior heat exchanger 52. The heat exchange medium that has passed through the exterior heat exchanger 52 is then drawn into the compressor 48 again via the flow path 58.

The cooling water heated inside the heat exchanger 44 by the heating action is circulated through the cooling water circulation path 12, including the pipe 30, and heats air in the proximity of the heater core 42 as it passes through the heater core 42. The heated air is supplied into the vehicle cabin interior by a blower, thereby heating the vehicle cabin interior.

Dehumidifying Heating Action of the Air-Conditioning Device

When an instruction to dehumidify and heat the vehicle cabin interior has been given by the vehicle occupant via the air-conditioning operation/display section 84, the air-conditioning control ECU 82 performs the following control. Namely, the air-conditioning control ECU 82 opens the first expansion valve 50 to a predetermined opening amount using the valve driver 94 in order to reduce the pressure of the heat exchange medium, opens the second expansion valve 60 to a predetermined opening amount so as to supply the heat exchange medium to the evaporator 62 at a flow rate required for cooling, and fully closes the solenoid valve 63. The air-conditioning control ECU 82 then drives the compressor 48 using the compressor driver 92.

During the dehumidifying heating action, air in the proximity of the evaporator 62 that has been cooled (dehumidified) by the evaporator 62 is heated by the heater core 42, before being supplied into the vehicle cabin interior by a blower so as to dehumidify and heat the vehicle cabin interior.

Next, explanation follows regarding action of the cooling device.

Action of Cooling Device During Engine Warm-Up

When the engine 14 is started, warm-up of the engine 14 is performed in cases in which the cooling water temperature Tw1 detected by the first water temperature sensor 36 is below a predetermined temperature. In such cases, the cooling water control ECU 72 uses the valve driver 90 to close or reduce the opening amount of the first solenoid valve 34, and close the second solenoid valve 38, and drives the WP 16 using the WP driver 86.

When driven, the WP 16 draws in cooling water from the upstream side of the pipe 18 and pumps out the cooling water toward the downstream side of the pipe 18. When the first solenoid valve 34 is closed, the cooling water pumped out by the WP 16 flows in sequence through the connection point 12B, the pipe 26, the connection point 12D, the pipe 30, and the connection point 12A. In cases in which the first solenoid valve 34 is opened by a small opening amount, in addition to the flow described above, cooling water also flows at a low flow rate along a path from the connection point 12B through the pipe 20, the connection point 12C, and the pipe 28 to the connection point 12D.

Accordingly, since the second solenoid valve 38 is closed and cooling water does not flow through the radiator 32 when warming up the engine 14, the cooling water temperature Tw1 rises to the predetermined temperature or greater in a short period of time as a result of waste heat from the engine 14, thereby completing warm-up of the engine 14 in a short period of time. Note that when warming up the engine 14, the air-conditioning control ECU 82 may also perform heat pump operation similar to that of the heating action. So doing further reduces the warm-up time of the engine 14.

Action of Cooling Device After Engine Warm-Up

When the engine 14 continues to run and the cooling water temperature Tw1 detected by the first water temperature sensor 36 reaches the predetermined temperature or greater, the cooling water control ECU 72 transitions to normal control. Specifically, the cooling water control ECU 72 opens the first solenoid valve 34 and the second solenoid valve 38 using the valve driver 90, and drives the WP 16 using the WP driver 86. Cooling water accordingly flows through the radiator 32, and the cooling water having a water temperature that has been raised by the waste heat of the engine 14 is cooled by the radiator 32. Moreover, when the cooling water temperature Tw1 has exceeded a threshold temperature, the cooling water control ECU 72 rotates the electric fan 64 forward so as to increase the flow rate of air blown through the radiator 32, thereby increasing the rate of heat release through the radiator 32.

De-Icing Control Processing

When heat pump operation is being performed by the air-conditioning device, the heat exchange medium evaporates as it passes through the exterior heat exchanger 52, and absorbs heat from the air in the proximity of the exterior heat exchanger 52. Accordingly, moisture contained in the air in the proximity of the exterior heat exchanger 52 adheres to the surface of the exterior heat exchanger 52 as ice. The amount of ice adhering to the surface of the exterior heat exchanger 52 gradually increases as heat pump operation continues, causing the heat exchange efficiency of the exterior heat exchanger 52 to drop. Accordingly, in the first exemplary embodiment, when the ignition switch of the vehicle has been turned off, the cooling water control ECU 72 performs the de-icing control processing illustrated in FIG. 3.

At step 150 of the de-icing control processing, the cooling water control ECU 72 acquires the ambient air temperature Tamb from the ambient air temperature sensor 66, acquires the cooling water temperature Tw1 inside the pipe 20 from the first water temperature sensor 36, and acquires the cooling water temperature Tw2 inside the pipe 30 from the second water temperature sensor 40. The cooling water control ECU 72 also requests the heat exchange medium temperature Tr from the air-conditioning control ECU 82, and acquires the heat exchange medium temperature Tr detected by the heat exchange medium temperature sensor 54 downstream of the exterior heat exchanger 52 from the air-conditioning control ECU 82.

At the next step 152, the cooling water control ECU 72 uses Equation (1) below to compute an estimated ice adhesion amount G_ice of the exterior heat exchanger 52 based on the ambient air temperature Tamb and the heat exchange medium temperature Tr acquired at step 150.

$$G\_ice = Tamb - Tr \quad (1)$$

At step 154, the cooling water control ECU 72 determines whether or not the estimated ice adhesion amount G_ice computed at step 152 is a predetermined value or greater.

If ice adhesion on the exterior heat exchanger 52 develops further, the temperature Tr of the heat exchange medium downstream of the exterior heat exchanger 52 falls, and the difference from the ambient air temperature Tamb increases. Accordingly, in the present exemplary embodiment, the difference between the ambient air temperature Tamb and the temperature Tr of the heat exchange medium downstream of the exterior heat exchanger 52 is employed to represent the estimated ice adhesion amount G_ice. De-icing may be determined to be unnecessary when the estimated ice adhesion amount G_ice of the exterior heat exchanger 52 is less than the predetermined value. Accordingly, processing transitions to step 174 in cases in which determination is negative at step 154, and the vehicle heat management system 10A is stopped and the de-icing control processing is ended.

In cases in which the estimated ice adhesion amount G_ice of the exterior heat exchanger 52 is the predetermined value or greater, de-icing of the exterior heat exchanger 52 may be determined to be necessary since the adhered ice would cause a drop in the heat exchange performance of the exterior heat exchanger 52, resulting in a drop in the heating ability of the air-conditioning device.

Accordingly, processing transitions to step 156 in cases in which determination is affirmative at step 154. At step 156, the cooling water control ECU 72 determines whether or not the ambient air temperature Tamb is a first predetermined temperature Tth1 or lower. The first predetermined temperature Tth1 is a temperature serving as a threshold for determining whether or not the ice on the exterior heat exchanger 52 will be melted by ambient air, and, for example, a temperature of 3° C. may be applied. However, there is no limitation thereto. In cases in which the ambient air temperature Tamb is higher than the first predetermined temperature Tth1, it may be determined that the ice on the exterior heat exchanger 52 will be melted by ambient air even if no action is taken. Accordingly, processing transitions to step 174 in cases in which determination is negative at step 156, the vehicle heat management system 10A is stopped, and the de-icing control processing is ended.

In cases in which the ambient air temperature Tamb is the first predetermined temperature Tth1 or lower, the likelihood of the ice on the exterior heat exchanger 52 being melted by the ambient air is low. Accordingly, processing transitions to step 158 in cases in which determination is affirmative at step 156. At step 158, the cooling water control ECU 72 starts first de-icing control. Namely, the cooling water control ECU 72 uses the valve driver 90 to close the first solenoid valve 34 and open the second solenoid valve 38, uses the WP driver 86 to drive the WP 16, and uses the electric fan driver 88 to rotate the electric fan 64 reversely.

Figure 4:
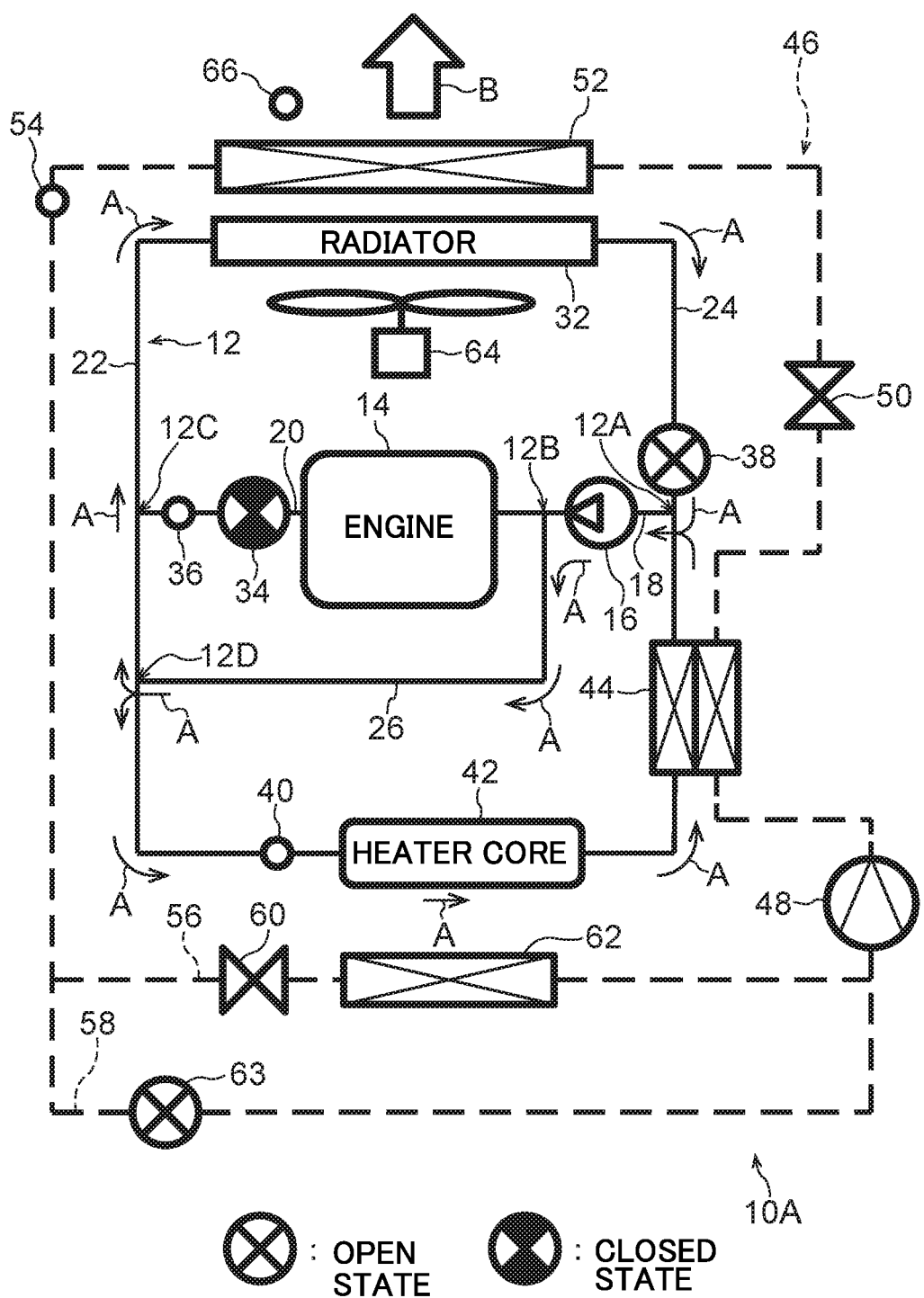
FIG. 4 is a schematic diagram illustrating a flow of cooling water during first de-icing control.

Thus, in the first de-icing control, as illustrated by arrows A in FIG. 4, cooling water leaving the WP 16 flows from the pipe 18 to the pipe 26 at the connection point 12B, and branches at the connection point 12D so as to flow from the pipe 26 to the pipe 28 and flow from the pipe 26 to the pipe 30. The cooling water that flows into the pipe 30 at the connection point 12D flows through the pipe 30 to reach the connection point 12A, flows from the pipe 30 to the pipe 18 at the connection point 12A, and is drawn into the WP 16. The cooling water that flows into the pipe 28 at the connection point 12D flows from the pipe 28 to the pipe 22 at the connection point 12C, passes through the radiator 32, flows through the pipe 24, flows from the pipe 24 to the pipe 18 at the connection point 12A, and is drawn into the WP 16.

Accordingly, in the cooling water circulation path 12, cooling water that was at positions inside pipes other than the pipe 20 at the start of the first de-icing control releases residual heat through the radiator 32 as it passes through the radiator 32 accompanying the cooling water circulation described above. Moreover, as illustrated by arrow B in FIG. 4, air is blown through the radiator 32 toward the exterior heat exchanger 52 by the electric fan 64 rotating reversely, and the blown air is heated by the radiator 32 and supplied to the exterior heat exchanger 52. De-icing of the exterior heat exchanger 52 is performed in this manner.

At step 160, the cooling water control ECU 72 acquires the ambient air temperature Tamb from the ambient air temperature sensor 66 and acquires the cooling water temperature Tw2 inside the pipe 30 from the second water temperature sensor 40. Note that the ambient air temperature Tamb acquired at step 160 is the temperature of the air that has been blown through the exterior heat exchanger 52. At step 162, the cooling water control ECU 72 determines whether or not the ambient air temperature Tamb acquired at step 160 is a second predetermined temperature Tth2 or lower. The second predetermined temperature Tth2 is a temperature serving as a threshold to determine whether or not de-icing of the exterior heat exchanger 52 has been completed based on the temperature of the air that has been blown through the exterior heat exchanger 52.

In cases in which determination is affirmative at step 162, it may be determined that de-icing of the exterior heat exchanger 52 is incomplete, and processing transitions to step 164. At step 164, the cooling water control ECU 72 determines whether or not the cooling water temperature Tw2 acquired at step 160 is a predetermined water temperature Twth or greater. The predetermined water temperature Twth is a temperature serving as a threshold to determine whether or not the water temperature is a temperature that can be used for de-icing, and, for example, a temperature of 5° C. may be applied therefor. However, there is no limitation thereto.

In cases in which determination is affirmative at step 164, processing returns to step 160 since de-icing of the exterior heat exchanger 52 is incomplete, and the cooling water temperature Tw2 inside the pipe 30 is at or above the predetermined water temperature Twth that can be used for de-icing. Step 160 to step 164 are thus repeated, and the first de-icing control is continued until determination is negative at either step 162 or step 164.

During the first de-icing control, in the cooling water circulation path 12, de-icing of the exterior heat exchanger 52 is performed using residual heat of the cooling water that was at positions inside pipes other than in the pipe 20 at the start of the first de-icing control. There is accordingly no need to run the engine 14, and so there is no wastage of power obtained by running the engine 14. Moreover, in the first de-icing control, cooling water that was at positions in the pipe 20 at the start of the first de-icing control is not circulated, such that residual heat in this cooling water is not released through the radiator 32. This suppresses a fall in the temperature of the cooling water that was at a position inside the pipe 20 at the start of the first de-icing control, and in the temperature of the engine 14. Accordingly, warm-up is completed in a short period of time when the engine 14 is subsequently run, thereby improving energy utilization efficiency (fuel consumption).

In cases in which de-icing of the exterior heat exchanger 52 is completed using the first de-icing control, determination is negative at step 162 and processing transitions to step 174, and the vehicle heat management system 10A is stopped, ending the de-icing control. On the other hand, in cases in which the cooling water temperature Tw2 falls below the predetermined water temperature Twth before de-icing of the exterior heat exchanger 52 has been completed, determination is negative at step 164 and processing transitions to step 166.

At step 166, the cooling water control ECU 72 starts second de-icing control. Specifically, the cooling water control ECU 72 uses the valve driver 90 to open the first solenoid valve 34 and the second solenoid valve 38, uses the WP driver 86 to drive the WP 16, and uses the electric fan driver 88 to rotate the electric fan 64 reversely.

Figure 5:
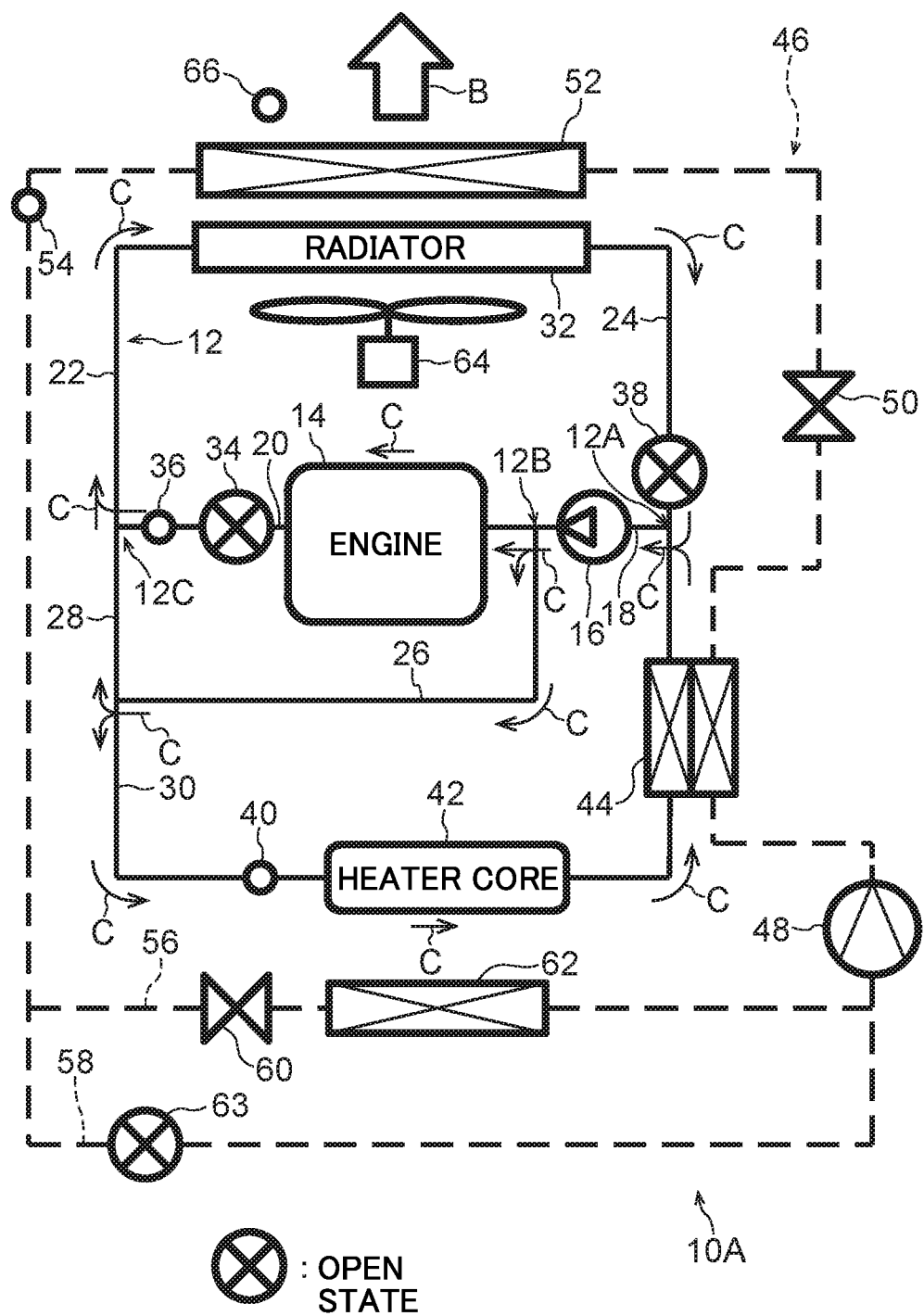
FIG. 5 is a schematic diagram illustrating a flow of cooling water during second de-icing control of the first exemplary embodiment.

Accordingly, in the second de-icing control, as illustrated by arrows C in FIG. 5, cooling water leaving the WP 16 branches at the connection point 12B to flow from the pipe 18 to the pipe 20 and to flow from the pipe 18 to the pipe 26. The cooling water that has flowed into the pipe 26 at the connection point 12B branches at the connection point 12D to flow from the pipe 26 to the pipe 28 and to flow from the pipe 26 to the pipe 30. The cooling water that has flowed into the pipe 30 flows through the pipe 30 to reach the connection point 12A, flows from the pipe 30 to the pipe 18 at the connection point 12A, and is drawn into the WP 16.

The cooling water that has flowed into the pipe 20 at the connection point 12B passes the engine 14 before merging with the flow from the pipe 28 at the connection point 12C, and flowing into the pipe 22. The cooling water that has flowed into the pipe 28 at the connection point 12C passes through the radiator 32, flows through the pipe 24, flows from the pipe 24 to the pipe 18 at the connection point 12A, and is drawn into the WP 16.

Accordingly, residual heat is released through the radiator 32 as the cooling water inside the cooling water circulation path 12, including the pipe 20, passes through the radiator 32 as the cooling water circulates. Air is blown through the radiator 32 toward the exterior heat exchanger 52 as illustrated by arrow B in FIG. 5 by the electric fan 64 rotating reversely, and this blown air is heated by the radiator 32 and supplied to the exterior heat exchanger 52. De-icing of the exterior heat exchanger 52 is performed in this manner.

At the next step 168, the cooling water control ECU 72 acquires the ambient air temperature Tamb from the ambient air temperature sensor 66, and acquires the cooling water temperature Tw1 inside the pipe 20 from the first water temperature sensor 36. At step 170, the cooling water control ECU 72 determines whether or not the ambient air temperature Tamb acquired at step 168 is the second predetermined temperature Tth2 or lower. In cases in which determination is affirmative at step 170, it may be determined that de-icing of the exterior heat exchanger 52 is incomplete, and so processing transitions to step 172. At step 172, the cooling water control ECU 72 determines whether or not the cooling water temperature Tw1 acquired at step 168 is the predetermined water temperature Twth or greater.

In cases in which determination is affirmative at step 172, de-icing of the exterior heat exchanger 52 is incomplete, and the cooling water temperature Tw2 inside the pipe 20 is at or above the predetermined water temperature Twth that can be utilized for de-icing. Accordingly, processing returns to step 168. Step 168 to step 172 are thereby repeated so as to continue the second de-icing control until determination is negative at either step 170 or step 172.

As described above, in the second de-icing control, in the cooling water circulation path 12, cooling water inside the pipe 20 is also circulated through the radiator 32, and residual heat in the circulating cooling water is released through the radiator 32. Accordingly, residual heat in the cooling water in the pipe 20 can be utilized to continue de-icing in cases in which the residual heat in the cooling water in the pipes other than the pipe 20 of the cooling water circulation path 12, used in the de-icing by the first de-icing control, is insufficient to complete de-icing of the exterior heat exchanger 52 on its own.

When de-icing of the exterior heat exchanger 52 has been completed by the second de-icing control, determination is negative at step 170, and processing transitions to step 174, where the vehicle heat management system 10A is stopped and the de-icing control processing is ended. Moreover, in cases in which the cooling water temperature Tw2 falls below the predetermined water temperature Twth before de-icing of the exterior heat exchanger 52 has been completed, determination is negative at step 172 and processing transitions to step 174, where the vehicle heat management system 10A is stopped and the de-icing control processing is ended.

Second Exemplary Embodiment

Next, explanation follows regarding a second exemplary embodiment of the present invention. Note that portions equivalent to those of the first exemplary embodiment are allocated the same reference numerals and explanation thereof is omitted, with explanation only being given regarding points that differ.

Figure 6:
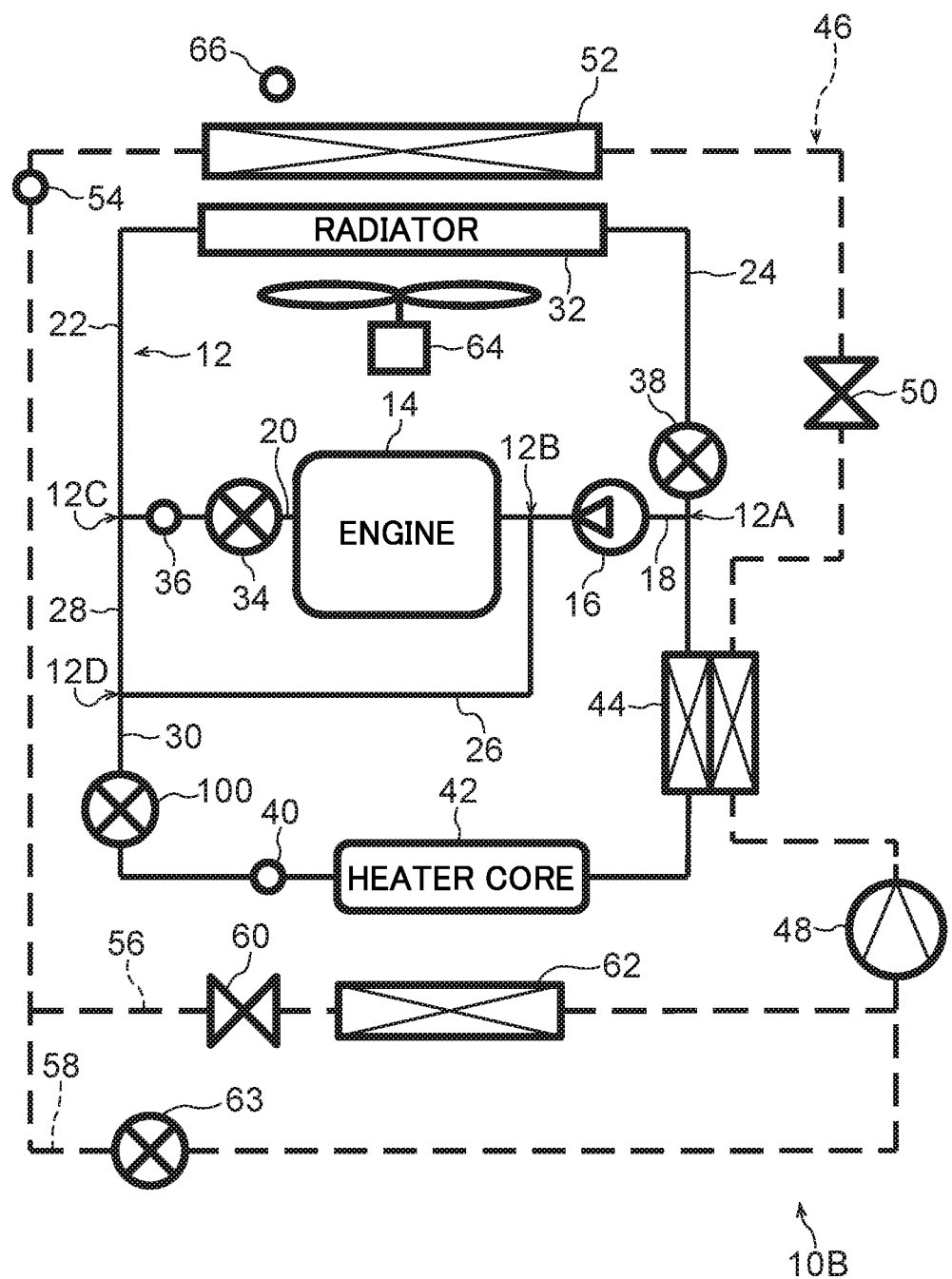
FIG. 6 is a schematic configuration diagram of a vehicle heat management system according to a second exemplary embodiment.
Figure 7:
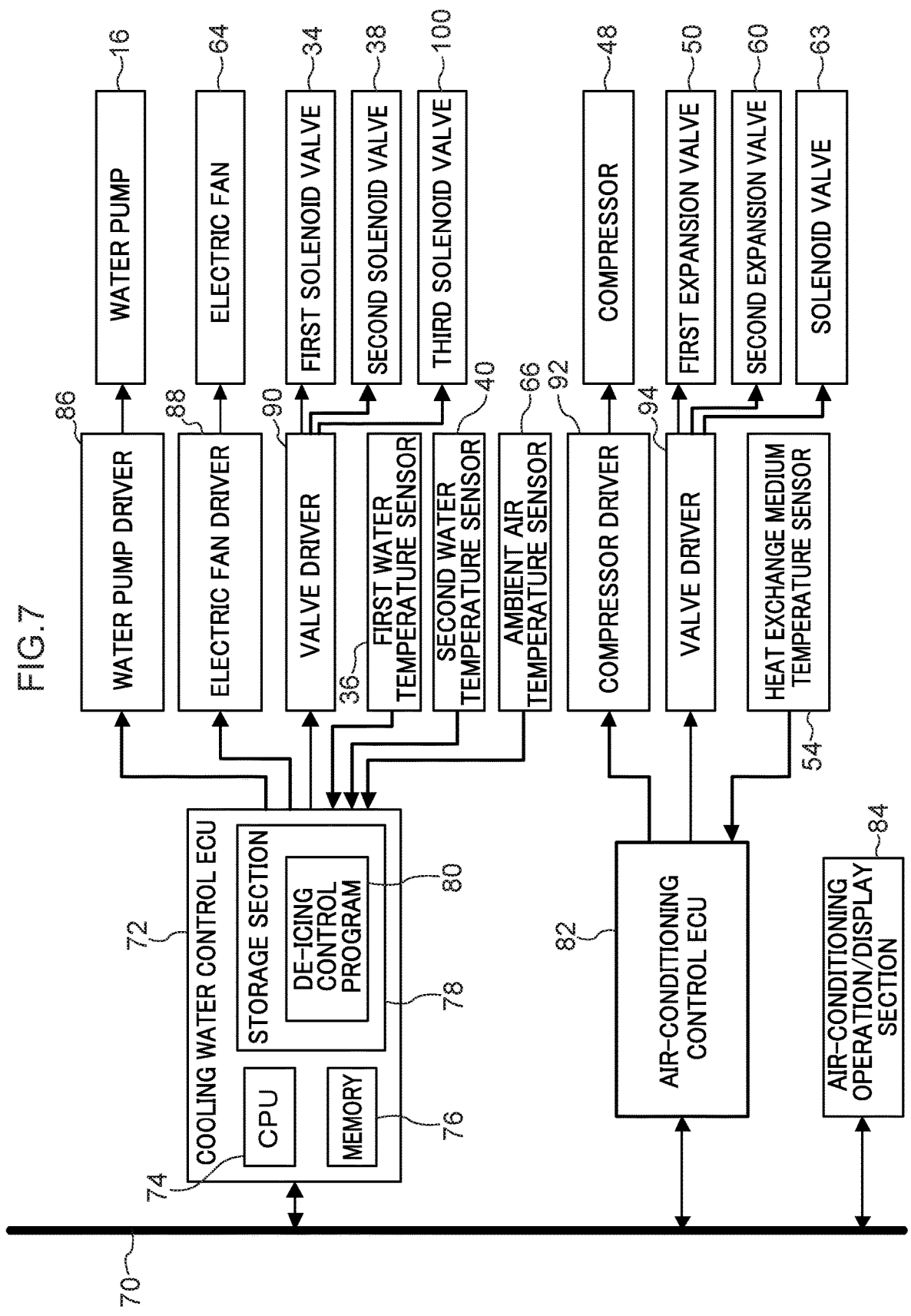
FIG. 7 is a schematic block diagram of sections of an in-vehicle system pertaining to a vehicle heat management system according to the second exemplary embodiment.

As illustrated in FIG. 6, a vehicle heat management system 10B according to the second exemplary embodiment differs from the vehicle heat management system 10A (FIG. 1) described in the first exemplary embodiment in the point that a third solenoid valve 100 is provided partway along the pipe 30. The third solenoid valve 100 can be opened and closed, and is provided between the connection point 12D and the second water temperature sensor 40. When the third solenoid valve 100 is in an open state, cooling water flows through the inside of the pipe 30, and when the third solenoid valve 100 is in a closed state, the flow of cooling water through the pipe 30 is stopped. The third solenoid valve 100 is an example of a second switching section of the present invention. As illustrated in FIG. 7, in the second exemplary embodiment, the valve driver 90 opens and closes the first solenoid valve 34, the second solenoid valve 38, and the third solenoid valve 100 under instructions from the cooling water control ECU 72.

Figure 8:
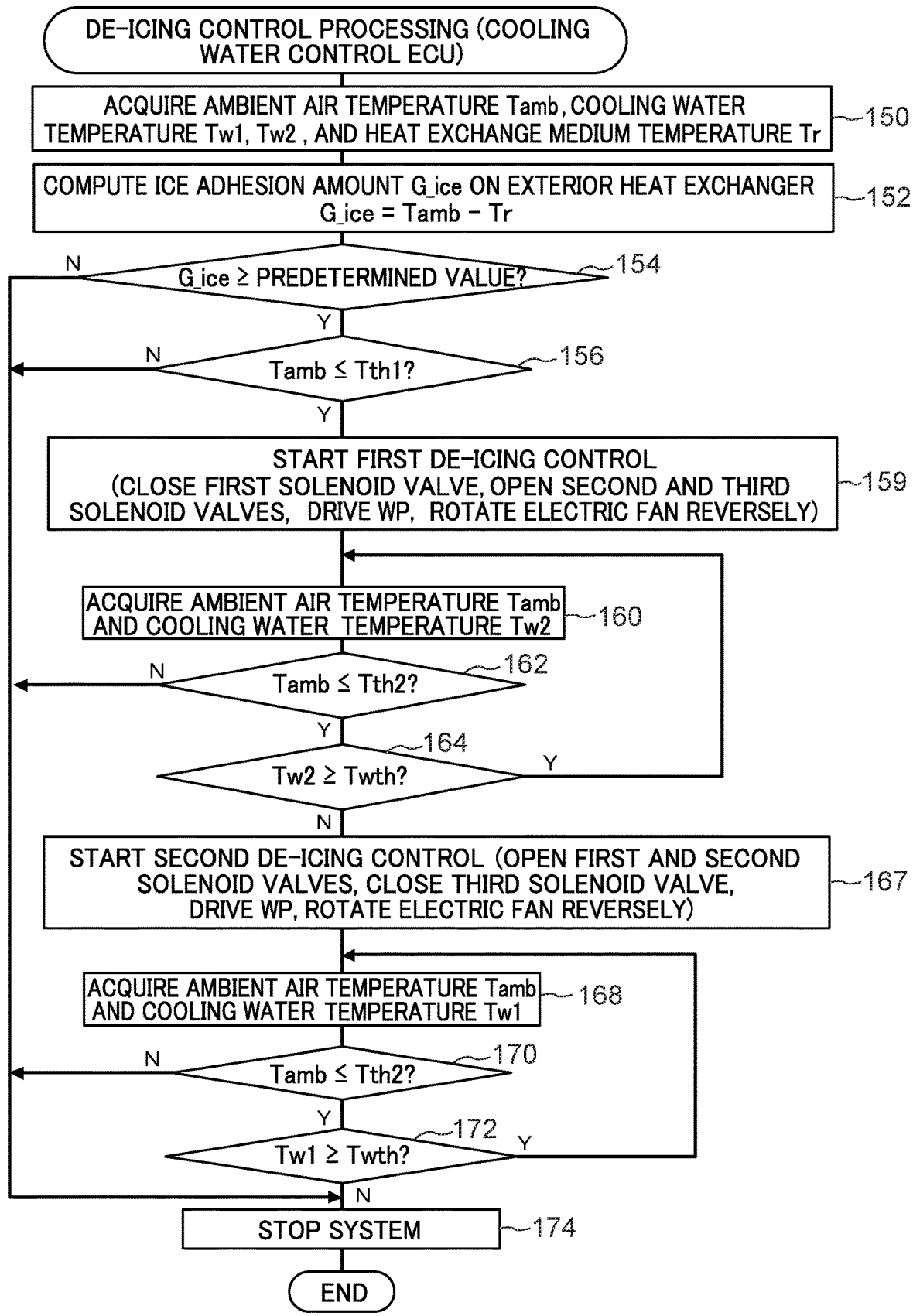
FIG. 8 is a flowchart illustrating de-icing control processing according to the second exemplary embodiment.

Next, explanation follows regarding elements of de-icing control processing according to the second exemplary embodiment that differ from the de-icing control processing (FIG. 3) described in the first exemplary embodiment, with reference to FIG. 8. In the de-icing control processing illustrated in FIG. 8, the cooling water control ECU 72 performs step 159 instead of step 158 at the start of the first de-icing control. Step 159 differs from step 158 in the point that the valve driver 90 is used to open the third solenoid valve 100. Note that the flow of cooling water in first de-icing control and the like is the same as that in the first exemplary embodiment, and so explanation thereof is omitted (see FIG. 4).

Moreover, in the de-icing control processing illustrated in FIG. 8, the cooling water control ECU 72 performs step 167 instead of step 166 at the start of the second de-icing control. Step 167 differs from step 166 in the point that the valve driver 90 is used to close the third solenoid valve 100.

Figure 9:
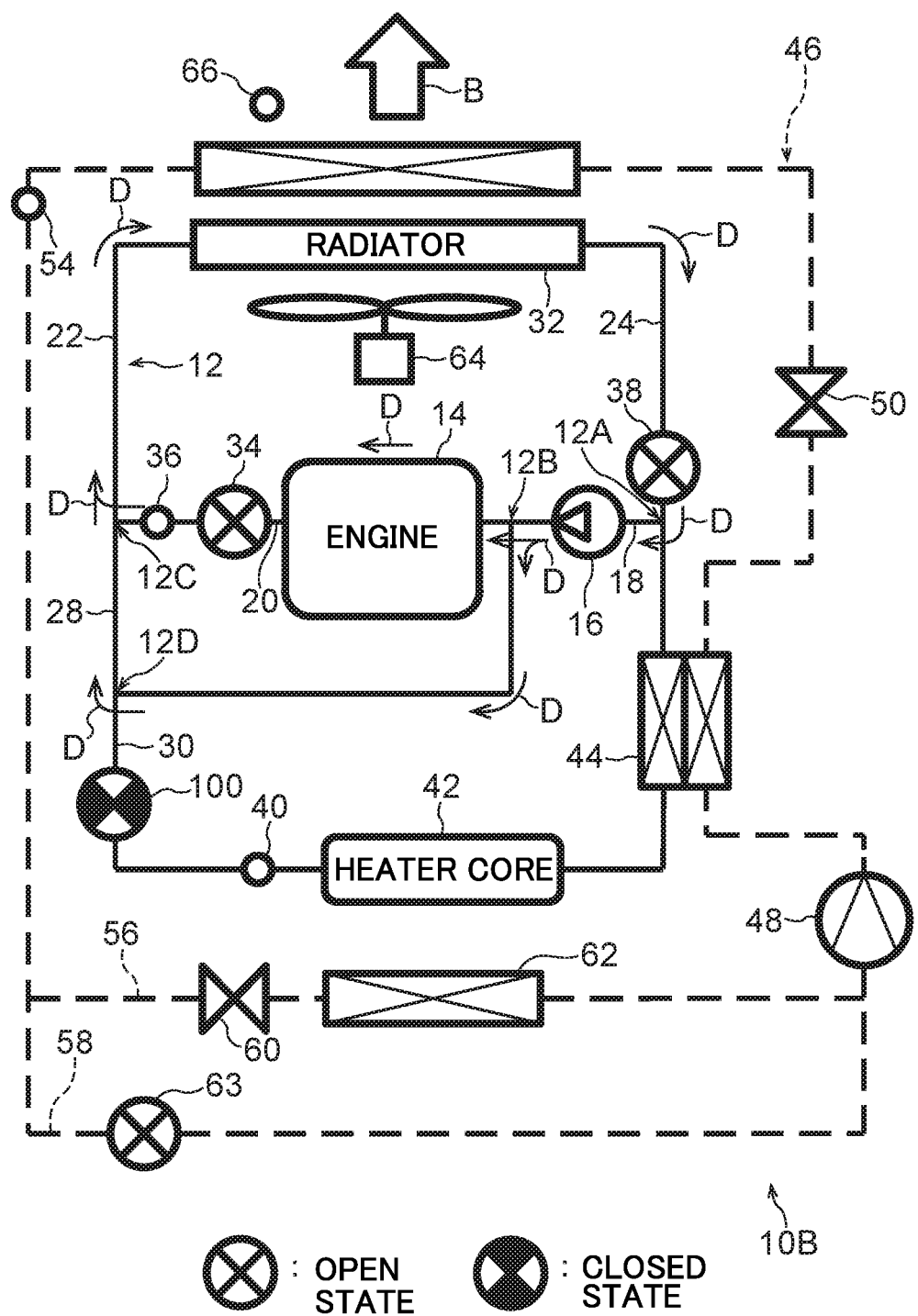
FIG. 9 is a schematic diagram illustrating a flow of cooling water during second de-icing control of the second exemplary embodiment.

Accordingly, in the second de-icing control according to the second exemplary embodiment, as illustrated by arrows D in FIG. 9, cooling water leaving the WP 16 branches at the connection point 12B to flow from the pipe 18 to the pipe 20 and flow from the pipe 18 to the pipe 26. The cooling water that has flowed into the pipe 26 at the connection point 12B flows from the pipe 26 to the pipe 28 at the connection point 12D. The cooling water that has flowed into the pipe 22 at the connection point 12B passes the engine 14 before merging with the flow from the pipe 28 at the connection point 12C, and flowing into the pipe 22. The cooling water that has flowed into the pipe 22 at the connection point 12C passes through the radiator 32, flows through the pipe 24, flows from the pipe 24 to the pipe 18 at the connection point 12A, and is drawn into the WP 16.

Accordingly, the cooling water in the cooling water circulation path 12, including the pipe 20, releases residual heat through the radiator 32 as it passes through the radiator 32 as the cooling water circulates. Moreover, as illustrated by the arrow B in FIG. 5, air is blown past the side of the radiator 32 toward the exterior heat exchanger 52 by the electric fan 64 rotating reversely, and this blown air is heated by the radiator 32 and supplied to the exterior heat exchanger 52. De-icing of the exterior heat exchanger 52 is performed in this manner.

On the other hand, in the second exemplary embodiment, cooling water in the pipe 30 is not circulated in the second de-icing control performed after the cooling water temperature Tw2 inside the pipe 30 has become lower than the predetermined water temperature Twth in the first de-icing control. Accordingly, the water temperature of the cooling water inside the pipe 20 that is circulated in the second de-icing control is prevented from falling as a result of mixing with the cooling water in the pipe 30 that has fallen in temperature. Accordingly, the second exemplary embodiment prevents a drop in de-icing efficiency in the second de-icing control caused by the cooling water inside the pipe 30 that has fallen in temperature, thereby enabling de-icing of the exterior heat exchanger 52 to be completed in a short period of time by the second de-icing control.

Third Exemplary Embodiment

Next, explanation follows regarding a third exemplary embodiment of the present invention. Note that elements equivalent to those of the first exemplary embodiment and the second exemplary embodiment are allocated the same reference numerals and explanation thereof is omitted, with explanation being given only regarding points that differ.

Figure 10:
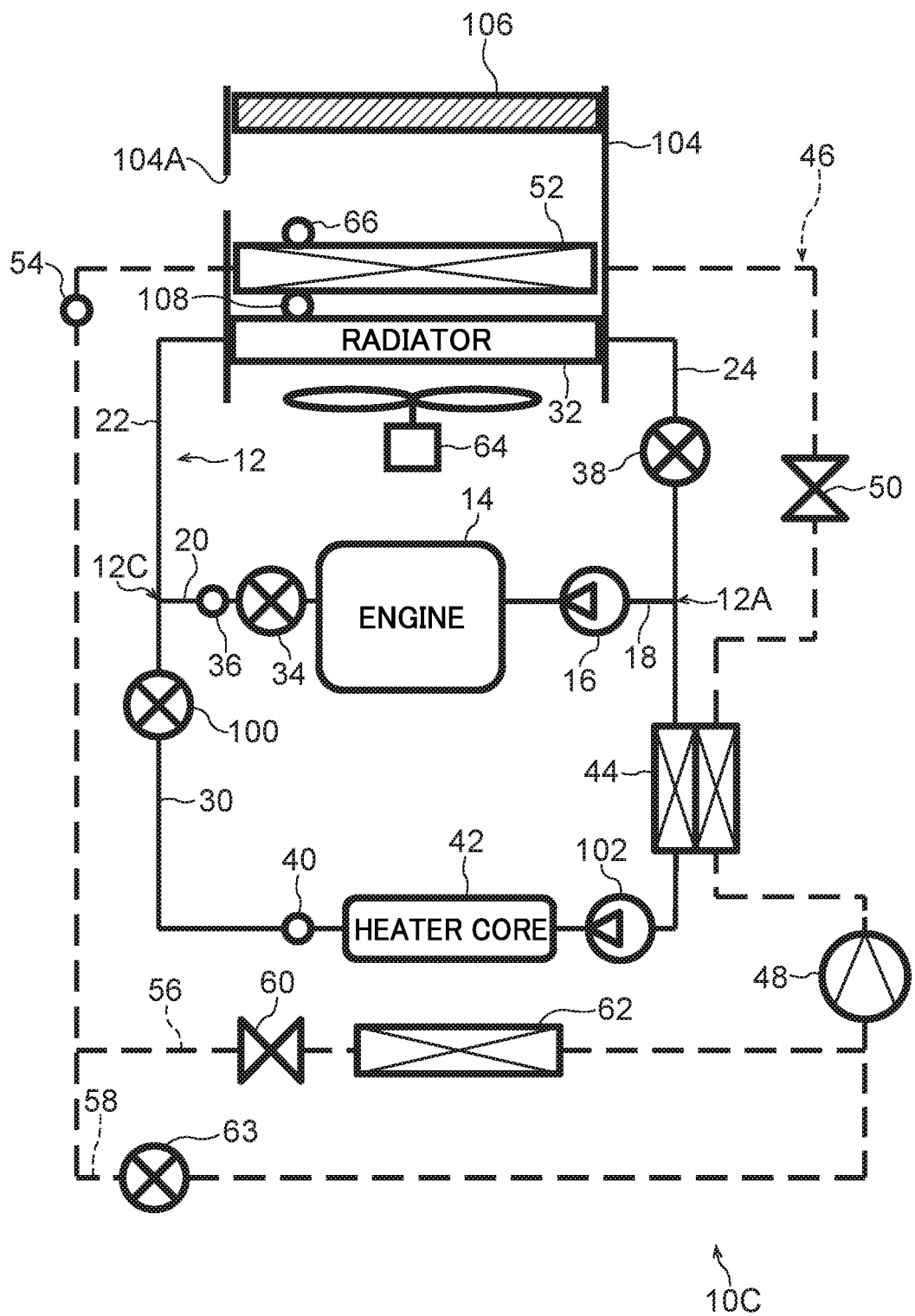
FIG. 10 is a schematic configuration diagram of a vehicle heat management system according to a third exemplary embodiment.

As illustrated in FIG. 10, a vehicle heat management system 10C according to the third exemplary embodiment differs from the vehicle heat management system 10B (FIG. 6) described in the second exemplary embodiment in the point that the pipes 26, 28 connecting the connection point 12B and the connection point 12D together are omitted. An end of the pipe 30 is thus connected to ends of the pipes 20, 22 at the connection point 12C.

Note that similarly to in the vehicle heat management system 10C, the pipes 26, 28 may also be omitted from the vehicle heat management system 10A (FIG. 1) described in the first exemplary embodiment or the vehicle heat management system 10B described in the second exemplary embodiment.

Figure 11:
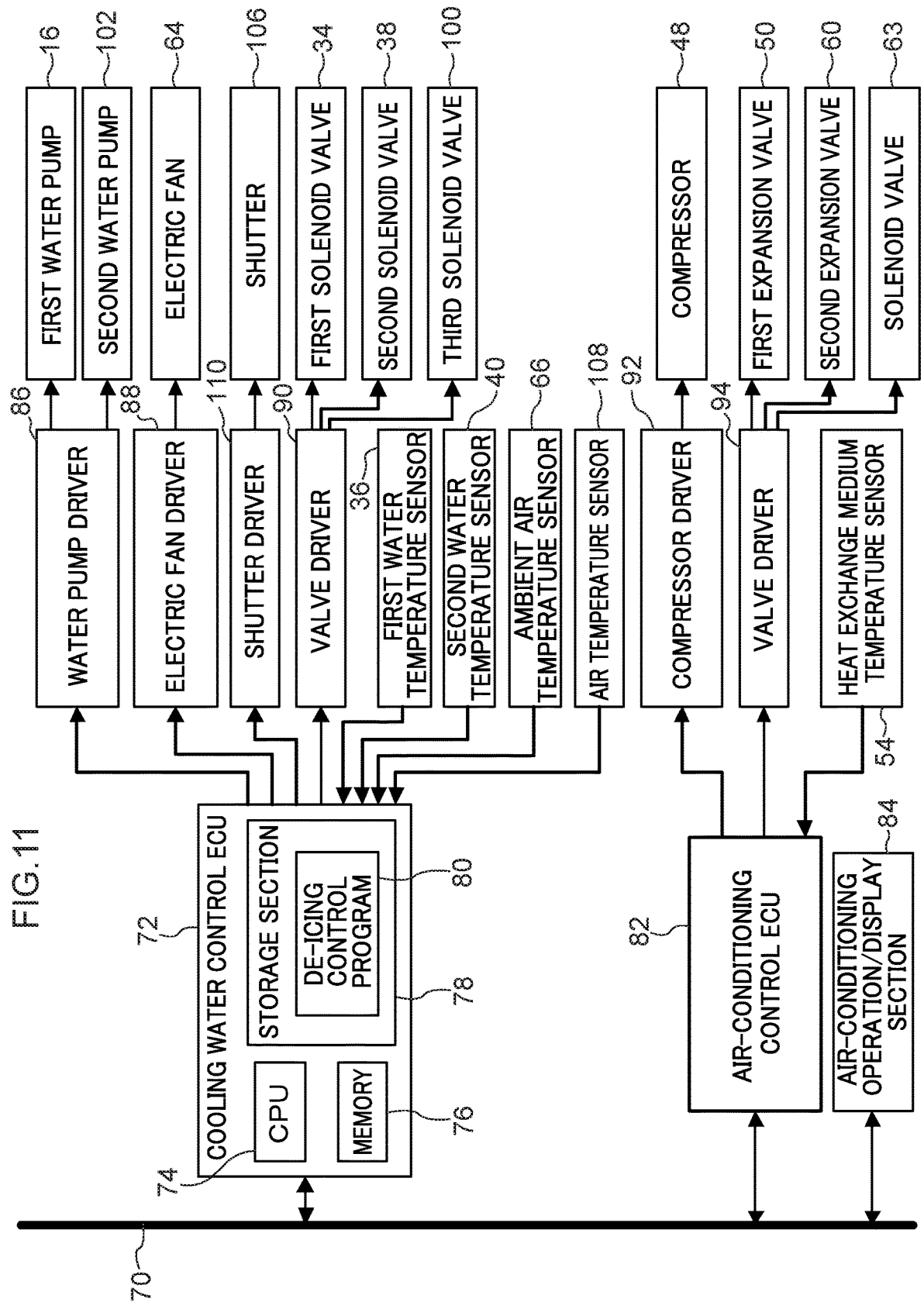
FIG. 11 is a schematic block diagram of sections of an in-vehicle system pertaining to a vehicle heat management system according to the third exemplary embodiment.

Moreover, the vehicle heat management system 10C is provided with a second WP 102 partway along the pipe 30, at a position between the heater core 42 and the heat exchanger 44. In the third exemplary embodiment, the WP provided partway along the pipe 18 is referred to as the "first WP 16", thereby distinguishing it from the second WP 102. As illustrated in FIG. 11, the WP driver 86 drives the first WP 16 and the second WP 102 under instructions from the cooling water control ECU 72. Note that the second WP 102 is another example of a pump of the present invention.

Moreover, in the vehicle heat management system 10C, a shielding duct 104, through which a motion-induced wind arising due to the motion of the vehicle passes when the vehicle is in motion, is disposed at a front section of the vehicle. The exterior heat exchanger 52 and the radiator 32 are disposed inside the shielding duct 104. A shutter 106 is provided at a vehicle front end of the shielding duct 104. The shutter 106 is capable of opening and closing an opening at the vehicle front of the shielding duct 104.

When the shutter 106 opens up the opening at the vehicle front of the shielding duct 104, the motion-induced wind is guided into the shielding duct 104 when the vehicle is in motion. The motion-induced wind guided into the shielding duct 104 blows against the exterior heat exchanger 52 and the radiator 32. When the closing shutter 106 closes off the opening at the vehicle front of the shielding duct 104, the motion-induced wind is not guided into the shielding duct 104 even when the vehicle is in motion, and the motion-induced wind is not supplied to the exterior heat exchanger 52 or the radiator 32. As illustrated in FIG. 11, the shutter 106 is opened and closed by a shutter driver 110 under instructions from the cooling water control ECU 72.

An opening 104A is provided in a side face of the shielding duct 104 at a position between the shutter 106 and the exterior heat exchanger 52. An air temperature sensor 108 is also provided inside the shielding duct 104, at a position between the exterior heat exchanger 52 and the radiator 32. As illustrated in FIG. 11, the air temperature sensor 108 is connected to the cooling water control ECU 72, and the air temperature sensor 108 detects an air temperature Trad between the exterior heat exchanger 52 and the radiator 32 in the shielding duct 104. The air temperature sensor 108 outputs the detection results to the cooling water control ECU 72. The air temperature sensor 108 is an example of an air temperature detection section of the present invention.

Figure 3:
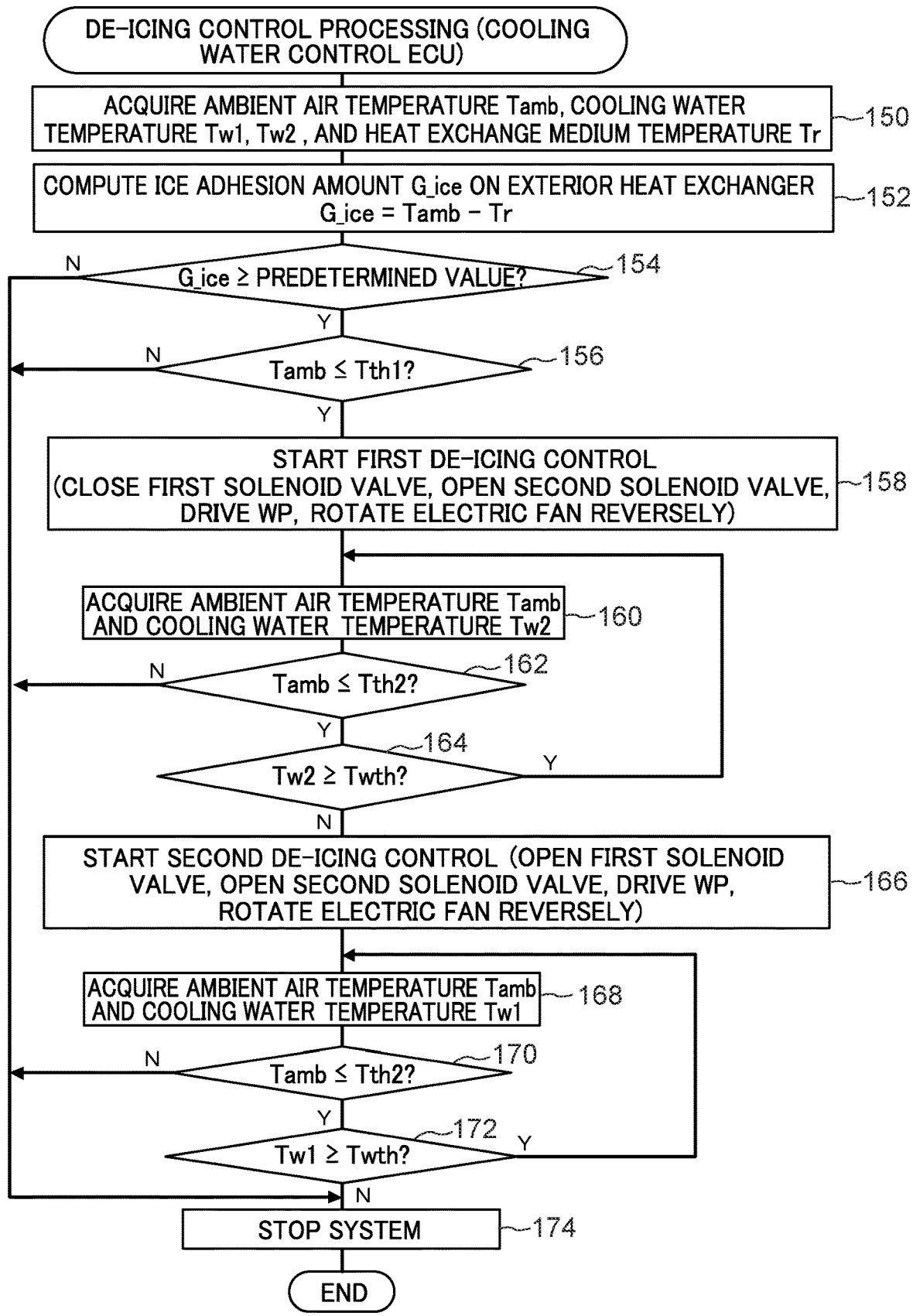
FIG. 3 is a flowchart illustrating de-icing control processing according to the first exemplary embodiment.
Figure 12:
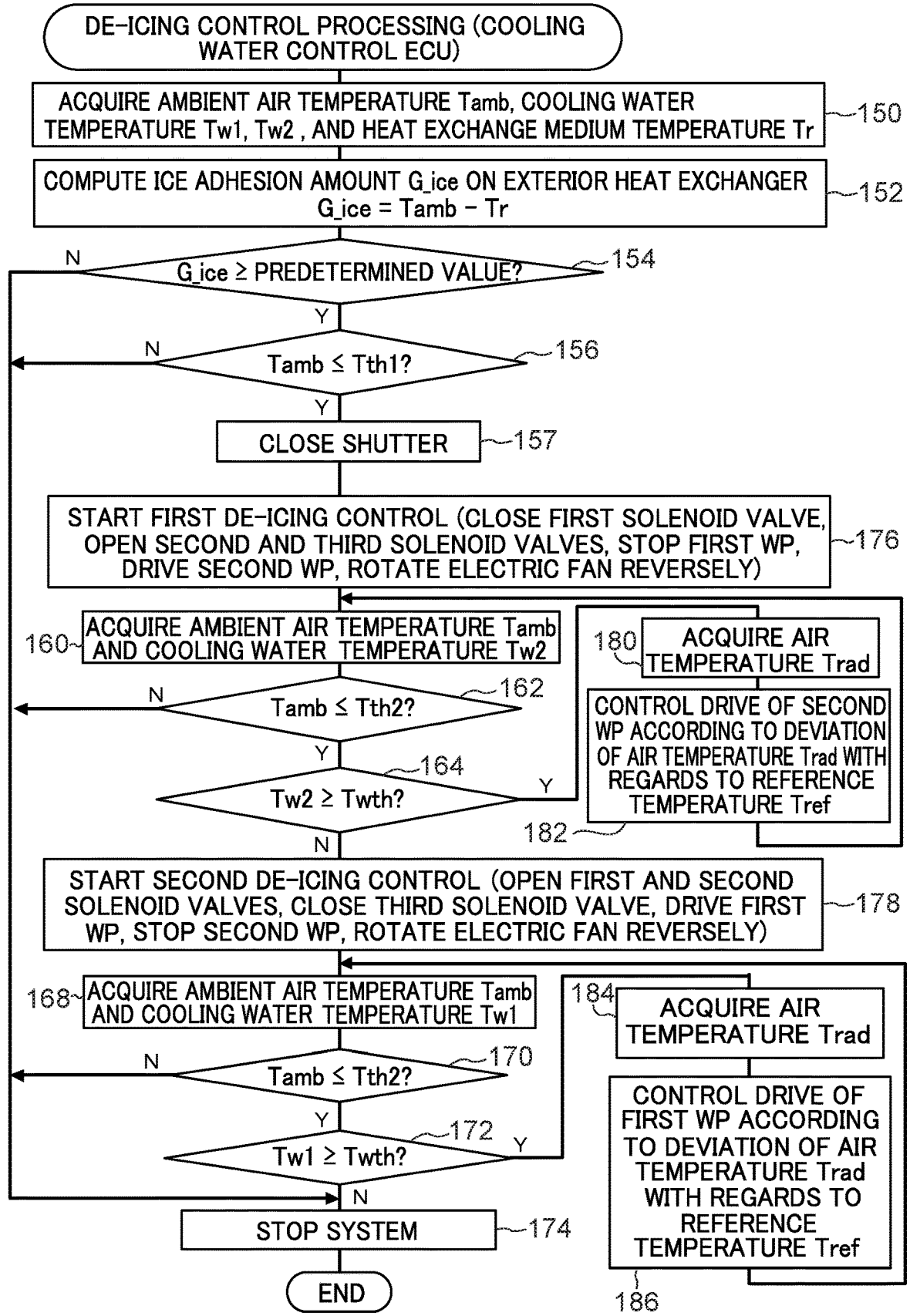
FIG. 12 is a flowchart illustrating de-icing control processing according to the third exemplary embodiment.

Next, with reference to FIG. 12, explanation follows regarding elements of de-icing control processing according to the third exemplary embodiment that differ from the de-icing control processing described in the first exemplary embodiment (FIG. 3). Note that in the first exemplary embodiment and the second exemplary embodiment, explanation has been given in which de-icing control processing is performed when the vehicle ignition switch has been turned off. However, in the third exemplary embodiment, de-icing control processing is performed all the time, including when the vehicle is in motion.

The de-icing control processing illustrated in FIG. 12 transitions to step 157 when the ambient air temperature Tamb is the first predetermined temperature Tth1 or lower and determination is affirmative at step 156. At step 157, the cooling water control ECU 72 uses the shutter driver 110 to close the shutter 106 such that the shutter 106 closes off the opening at the vehicle front of the shielding duct 104.

Moreover, at the next step 176, the cooling water control ECU 72 starts the first de-icing control. Specifically, the cooling water control ECU 72 uses the valve driver 90 to close the first solenoid valve 34 and open the second solenoid valve 38 and the third solenoid valve 100, and uses the WP driver 86 to stop drive of the first WP 16 and drive the second WP 102. The cooling water control ECU 72 also uses the electric fan driver 88 to rotate the electric fan 64 reversely.

Figure 13:
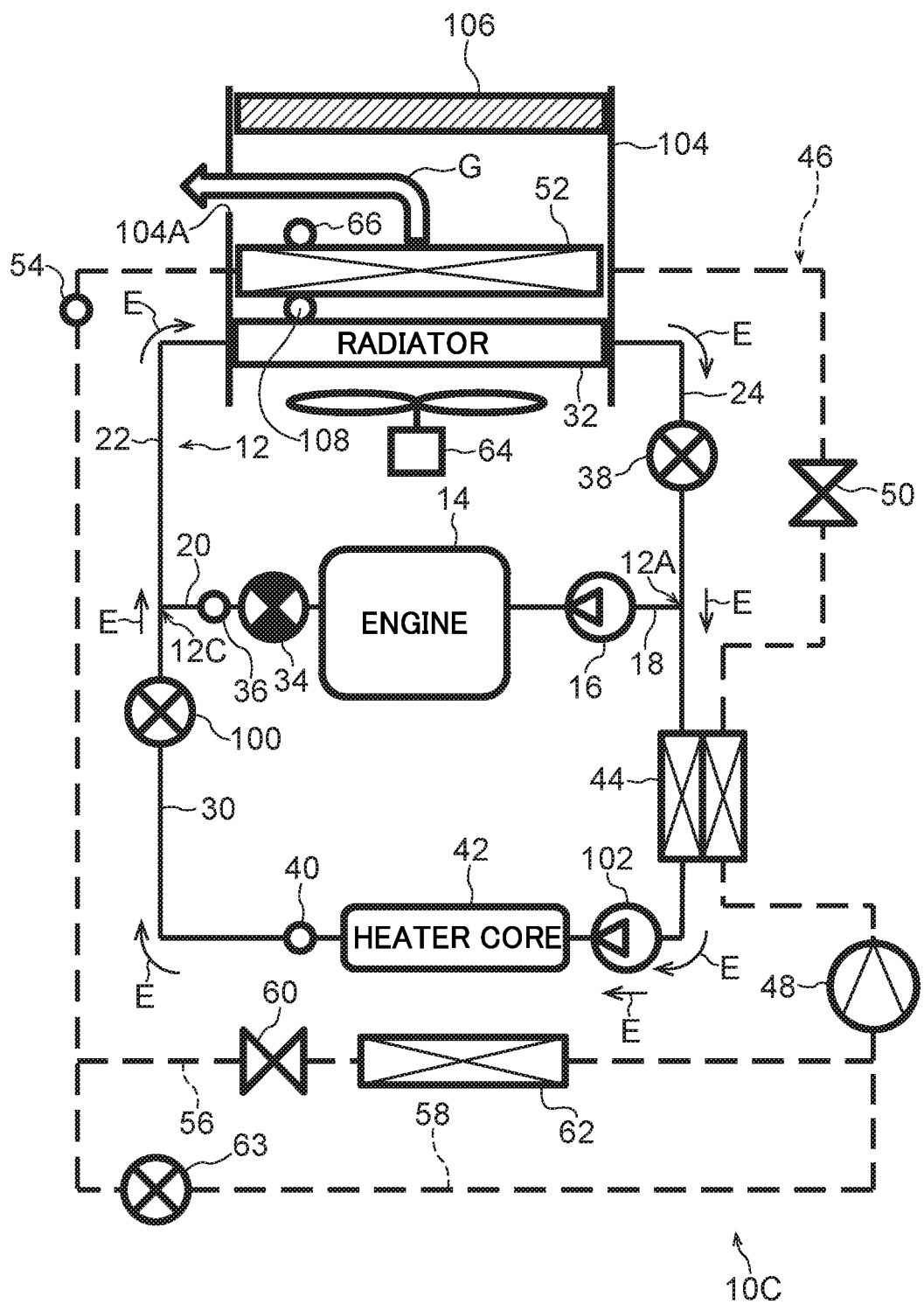
FIG. 13 is a schematic diagram illustrating a flow of cooling water during first de-icing control of the third exemplary embodiment.

Accordingly, in the first de-icing control of the third exemplary embodiment, as illustrated by arrows E in FIG. 13, cooling water leaving the second WP 102 flows into the pipe 30, flows from the pipe 30 to the pipe 22 at the connection point 12C, and passes through the radiator 32. Moreover, cooling water that has passed through the radiator 32 flows through the pipe 24, flows from the pipe 24 to the pipe 30 at the connection point 12A, and is drawn into the second WP 102. Accordingly, in the cooling water circulation path 12, cooling water that was at a position inside pipes other than the pipes 18, 20 at the start of the first de-icing control releases residual heat through the radiator 32 as it passes through the radiator 32 as the cooling water circulates.

As illustrated by the arrow Gin FIG. 13, air is blown through the radiator 32 toward the exterior heat exchanger 52 by the electric fan 64 rotating reversely. The blown air is heated by the radiator 32 and supplied to the exterior heat exchanger 52. De-icing of the exterior heat exchanger 52 is performed in this manner. Moreover, since the opening at the vehicle front of the shielding duct 104 is closed off by the shutter 106, the blown air supplied to the exterior heat exchanger 52 is expelled to the exterior of the shielding duct 104 via the opening 104A provided in the side face of the shielding duct 104.

Due to closing the opening at the vehicle front of the shielding duct 104 with the shutter 106, the motion-induced wind arising due to the motion of the vehicle is not supplied to the exterior heat exchanger 52 when the first de-icing control is performed when the vehicle is in motion. This thereby enables motion-induced wind to be suppressed from causing a drop in the ability to de-ice the exterior heat exchanger 52.

During the first de-icing control, when the cooling water temperature Tw2 is the predetermined water temperature Twth or greater and determination is affirmative at step 164, processing transitions to step 180. At step 180, the cooling water control ECU 72 acquires the air temperature Trad from the air temperature sensor 108. Note that the air temperature Trad acquired at step 180 is the temperature of the blown air being supplied to the exterior heat exchanger 52 after passing through the radiator 32.

At the next step 182, the cooling water control ECU 72 computes a deviation $\Delta T$ obtained by subtracting a pre-set reference temperature Tref from the air temperature Trad acquired at step 180, and controls drive of the second WP 102 according to the computed deviation $\Delta T$.

Namely, in cases in which the computed deviation $\Delta T$ is a negative value, the cooling water control ECU 72 increases the drive amount of the second WP 102 according to the magnitude of the absolute value of the deviation $\Delta T$. The increase in the drive amount of the second WP 102 may be implemented by increasing the drive speed of the second WP 102 in cases in which the second WP 102 is being driven continuously, and may be implemented by increasing the ratio of drive time of the second WP 102 in cases in which the second WP 102 is being driven intermittently.

Moreover, in cases in which the computed deviation ΔT is a positive value, the cooling water control ECU 72 decreases the drive amount of the second WP 102 according to the magnitude of the absolute value of the deviation ΔT. The decrease in the drive amount of the second WP 102 may be implemented by decreasing the drive speed of the second WP 102 in cases in which the second WP 102 is being driven continuously, and may be implemented by decreasing the ratio of drive time of the second WP 102 in cases in which the second WP 102 is being driven intermittently.

Performing the above control controls the drive of the second WP 102 so as to make the air temperature Trad detected by the air temperature sensor 108 match the reference temperature Tref. Accordingly, since the temperature Trad of the blown air supplied to the exterior heat exchanger 52 becomes the reference temperature Tref, the de-icing performance of the exterior heat exchanger 52 can be improved, and de-icing of the exterior heat exchanger 52 can be completed in a short period of time. Note that drive of the electric fan 64 may be controlled instead of controlling the drive of the second WP 102, or the drive of both the second WP 102 and the electric fan 64 may be controlled.

Moreover, when determination is negative at step 164, processing transitions to step 178. At step 178, the cooling water control ECU 72 starts the second de-icing control. Specifically, the cooling water control ECU 72 uses the valve driver 90 to open the first solenoid valve 34 and the second solenoid valve 38, and to close the third solenoid valve 100, and uses the WP driver 86 to drive the first WP 16 and stop drive of the second WP 102. The cooling water control ECU 72 also uses the electric fan driver 88 to rotate the electric fan 64 reversely.

Figure 14:
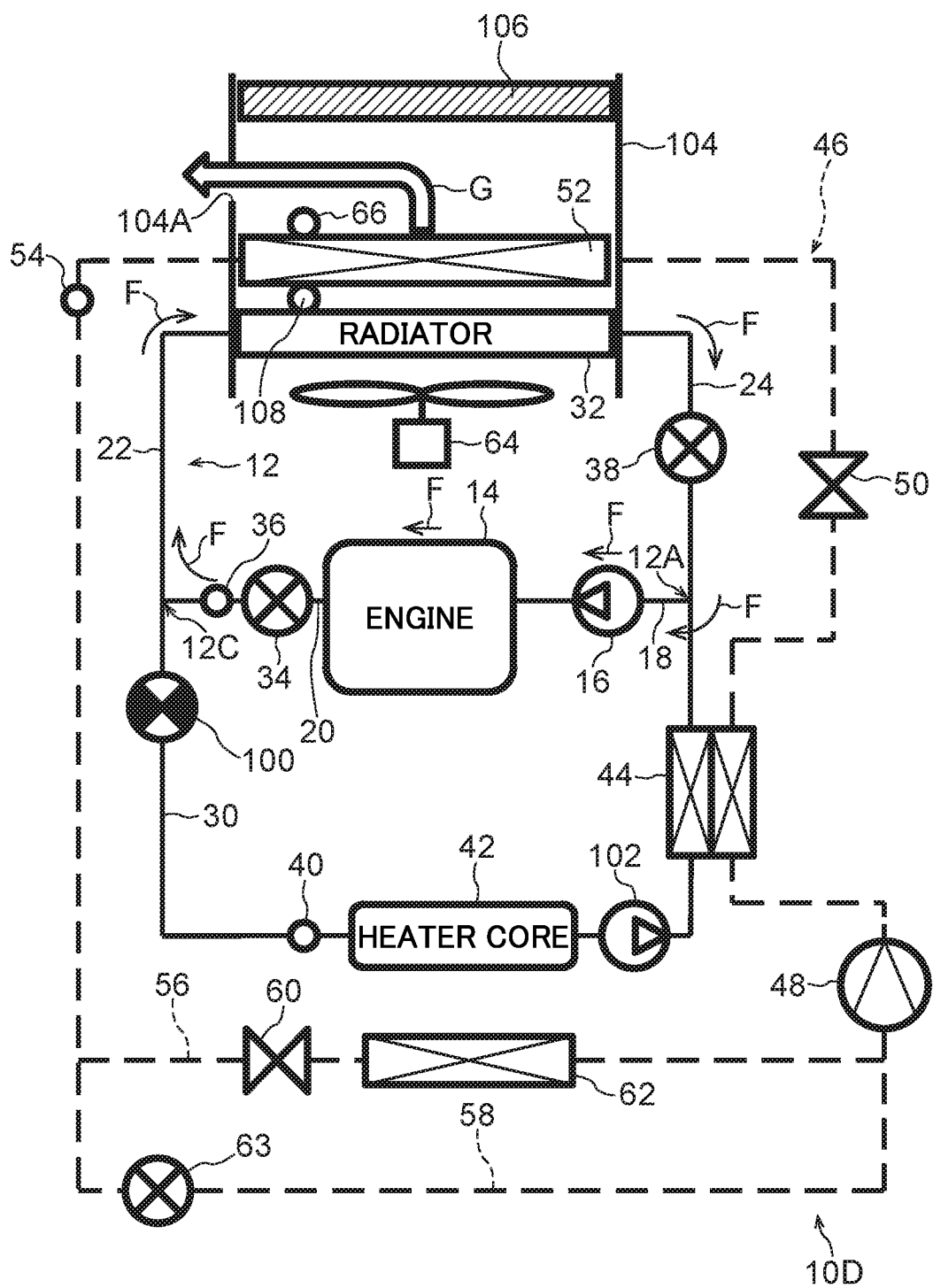
FIG. 14 is a schematic diagram illustrating a flow of cooling water during second de-icing control of the third exemplary embodiment.

Accordingly, in the second de-icing control of the third exemplary embodiment, as illustrated by arrows F in FIG. 14, cooling water leaving the first WP 16 flows through the pipes 18, 20, flows from the pipe 20 to the pipe 22 at the connection point 12C, and passes through the radiator 32. Moreover, cooling water that has passed through the radiator 32 flows through the pipe 24, flows from the pipe 24 to the pipe 18 at the connection point 12A, and is drawn into the first WP 16. Accordingly, in the cooling water circulation path 12, cooling water that was at positions inside the pipes 18, 20 at the start of the first de-icing control releases residual heat through the radiator 32 as it passes through the radiator 32 as the cooling water circulates.

Moreover, the cooling water temperature Tw2 of the cooling water that was at a position inside the pipe 30 at the start of the first de-icing control has fallen below the predetermined water temperature Twth at the point in time when the second de-icing control is started. In the second de-icing control, cooling water with a cooling water temperature Tw2 that has fallen below the predetermined water temperature Twth is not circulated, thereby enabling the de-icing performance of the cooling water that was at positions inside the pipes 18, 20 at the start of the first de-icing control to be suppressed from dropping as a result of mixing with cooling water that is below the predetermined water temperature Twth. Moreover, in the second de-icing control, the opening at the vehicle front of the shielding duct 104 is closed off by the shutter 106, such that motion-induced wind arising due to motion of the vehicle is not supplied to the exterior heat exchanger 52 even if the second de-icing control is performed when the vehicle is in motion. This thereby enables motion-induced wind to be suppressed from causing a drop in the ability to de-ice the exterior heat exchanger 52.

During the second de-icing control, when the cooling water temperature Tw1 is the predetermined water temperature Twth or greater and determination is affirmative at step 172, processing transitions to step 184. At step 184, the cooling water control ECU 72 acquires the air temperature Trad from the air temperature sensor 108. At the next step 186, the cooling water control ECU 72 computes the deviation ΔT by subtracting the preset reference temperature Tref from the air temperature Trad acquired at step 184, and controls drive of the first WP 16 according to the computed deviation ΔT.

Note that in the drive control of the first WP 16, control similar to the drive control of the second WP 102 described above at step 182, for example, may be performed. Accordingly, drive of the first WP 16 is controlled so as to make the air temperature Trad detected by the air temperature sensor 108 match the reference temperature Tref. Since the temperature Trad of the blown air supplied to the exterior heat exchanger 52 becomes the reference temperature Tref, the de-icing performance of the exterior heat exchanger 52 can be improved, and de-icing of the exterior heat exchanger 52 can be completed in a short period of time.

Note that the drive of the electric fan 64 may be controlled instead of controlling drive of the first WP 16, or the drive of both the first WP 16 and the electric fan 64 may be controlled.

Fourth Exemplary Embodiment

Next, explanation follows regarding a fourth exemplary embodiment of the present invention. Note that a vehicle heat management system according to the fourth exemplary embodiment has a similar configuration to the vehicle heat management system 10C described in the third exemplary embodiment. In the fourth exemplary embodiment, each element is allocated the same reference numerals as in the third exemplary embodiment, and explanations thereof are omitted.

Figure 15:
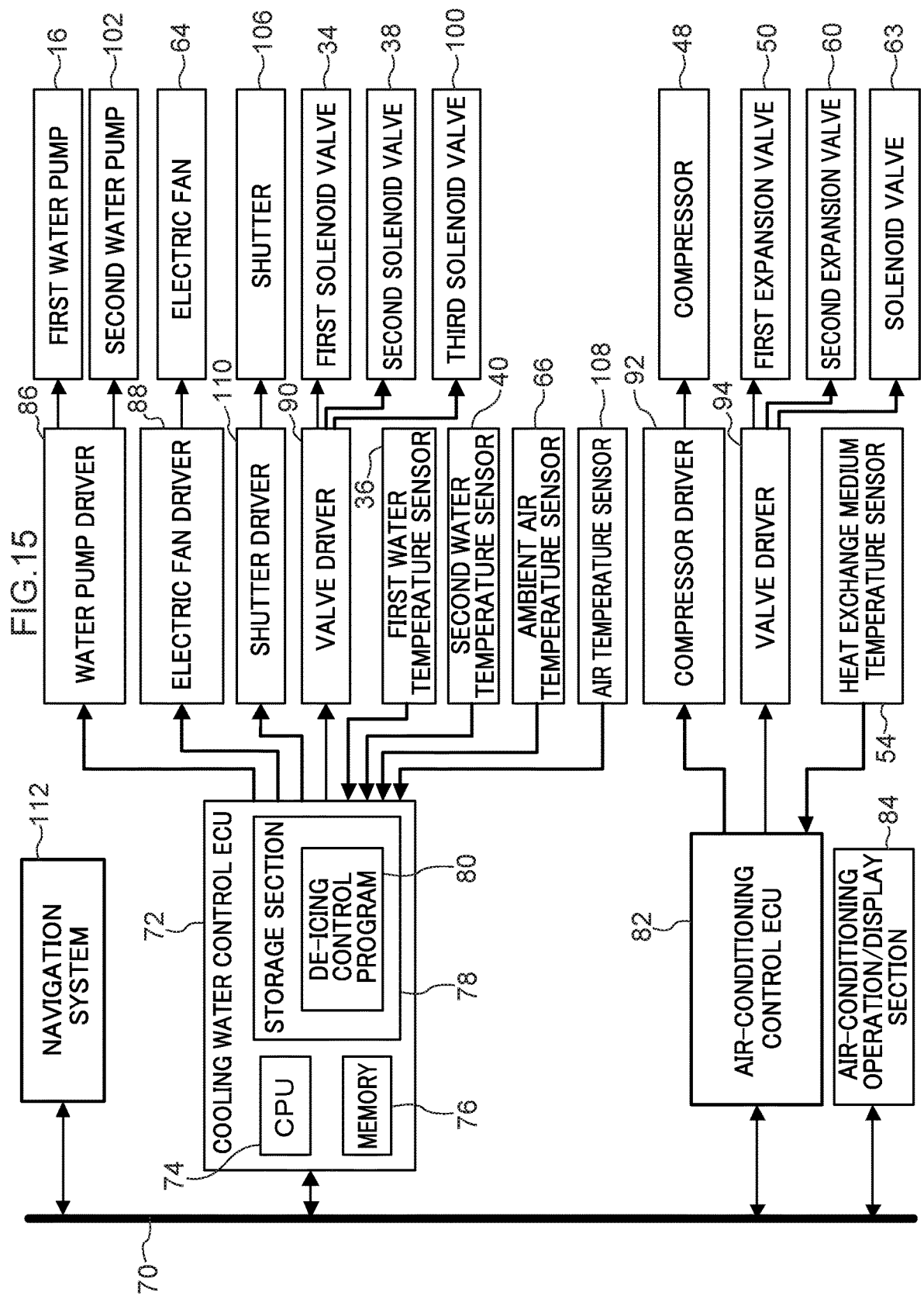
FIG. 15 is a schematic block diagram of sections of an in-vehicle system pertaining to a vehicle heat management system according to a fourth exemplary embodiment.

As illustrated in FIG. 15, in an in-vehicle system according to the fourth exemplary embodiment, a navigation system 112 is connected to the bus 70. The navigation system 112 includes a Global Positioning System (GPS) device and a storage section storing map information. The GPS device measures the location of the vehicle by receiving GPS signals from plural GPS satellites. The precision of measurements by the GPS device improves the greater the number of GPS signals that the GPS device can receive. The navigation system 112 performs processing to identify the location of the vehicle, display the vehicle on a map, and provide route guidance to a destination based on location information obtained from the GPS device and map information stored in the storage section.

Figure 16:
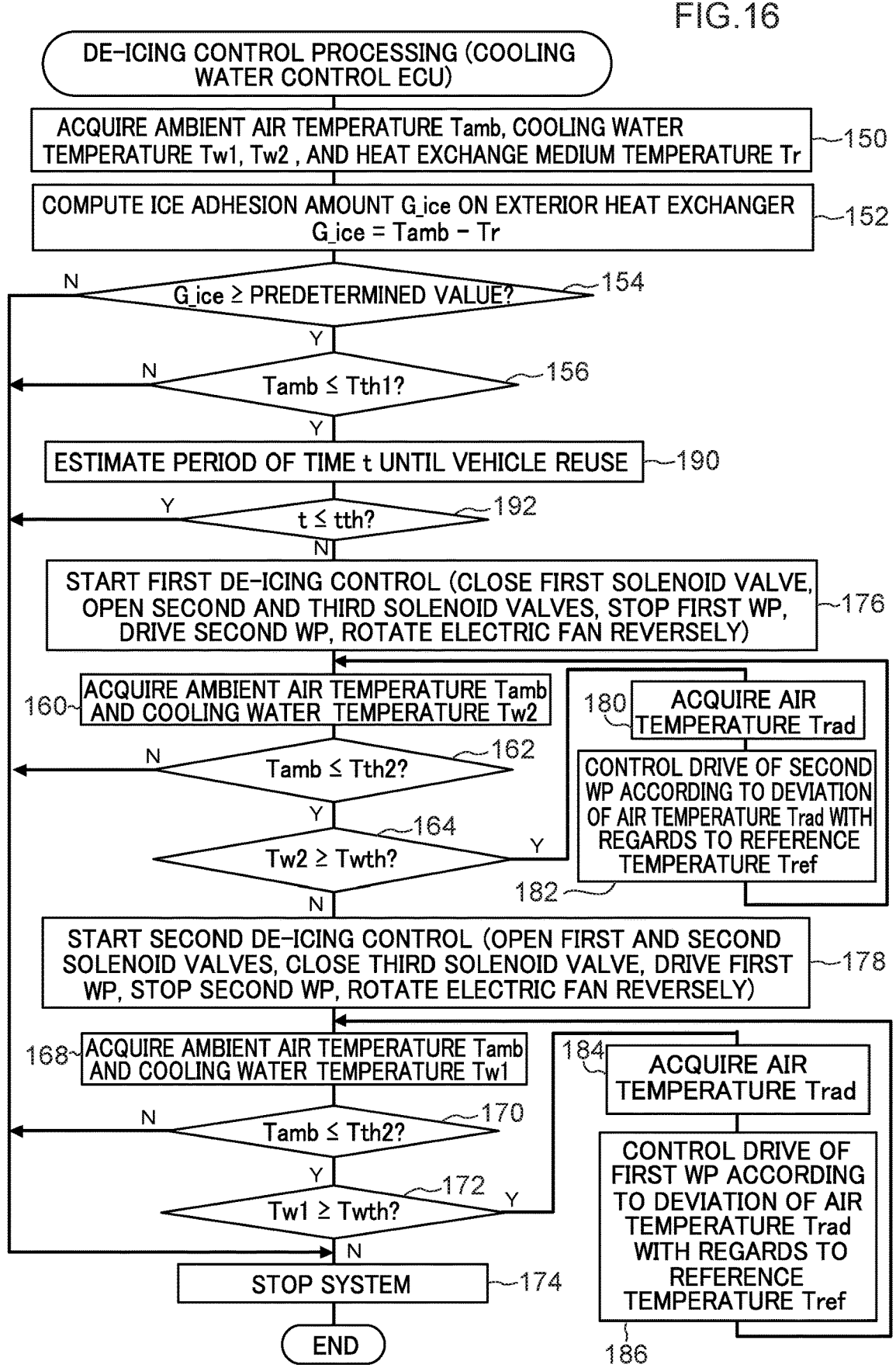
FIG. 16 is a flowchart illustrating de-icing control processing according to the fourth exemplary embodiment.

Next, explanation follows regarding operation of the fourth exemplary embodiment. In the fourth exemplary embodiment, when the vehicle is in motion, the de-icing control processing described in the third exemplary embodiment (FIG. 12) is performed, and when the ignition switch of the vehicle has been switched off, the de-icing control processing illustrated in FIG. 16 is performed. The de-icing control processing illustrated in FIG. 16 differs from the de-icing control processing described in the third exemplary embodiment (FIG. 12) in the point that steps 190, 192 are performed instead of step 157.

In the de-icing control processing illustrated in FIG. 16, when the ambient air temperature Tamb is the first predetermined temperature Tth1 or lower and determination is affirmative at step 156, processing transitions to step 190. At step 190, the cooling water control ECU 72 acquires the current location of the vehicle from the navigation system 112, and predicts a period of time t until the vehicle will be used again based on the acquired current location of the vehicle and the current time. Then, at the next step 192, determination is made as to whether or not the predicted vehicle reuse period of time t is a pre-set predetermined period of time tth or shorter. For example, a period of time from a few minutes to approximately 30 minutes may be applied as the predetermined period of time tth. However, there is no limitation thereto. When determination is negative at step 192, processing transitions to step 176 and the first de-icing control is started. When determination is affirmative at step 192, processing transitions to step 174 and de-icing control processing is ended.

For example, at steps 190, 192, determination is made as to whether or not the current location of the vehicle acquired from the navigation system 112 corresponds to a pre-registered home address of the user of the vehicle, and whether or not the current time corresponds to the nighttime. In cases in which the current location of the vehicle corresponds to the home address of the user and the current time corresponds to the nighttime, the period of time t until the vehicle will be used again is predicted. Then, at the next step 192, determination is made as to whether or not the predicted vehicle reuse period of time t is the pre-set predetermined period of time tth or shorter. For example, a period of time from a few minutes to approximately 30 minutes may be applied as the predetermined period of time tth. However, there is no limitation thereto. When determination is negative at step 192, processing transitions to step 176 and the first de-icing control is started, and when determination is affirmative at step 192, processing transitions to step 174 and the de-icing control processing is ended.

As another example, at steps 190, 192, determination is made as to whether or not the current location of the vehicle acquired from the navigation system 112 corresponds to the pre-registered home address of the vehicle user, and whether or not the current time corresponds to the nighttime. In cases in which the current location of the vehicle corresponds to the home address of the user and the current time corresponds to the nighttime, there is a high likelihood that the vehicle will be used again the following morning, and thus a period of time until the following morning is predicted as the vehicle reuse period of time t. In such cases, the first de-icing control is started when the vehicle reuse period of time t is determined to be greater than the predetermined period of time tth. This thereby suppresses a state in which, for example, an extended period in which heating is ineffective due to heavy ice adhesion on the exterior heat exchanger 52 arises when the vehicle is used again the following morning.

On the other hand, for example, in cases in which the current location of the vehicle does not correspond to the home address of the user, or in cases in which the current time does not correspond to the nighttime, there is a high likelihood that the vehicle is parked in a convenience store parking lot or the like and that the vehicle will be used again within a short period of time. In such cases, the vehicle reuse period of time t is predicted to be a comparatively short period of time, and the vehicle reuse period of time t is less than or equal to the predetermined period of time tth. The de-icing control processing is accordingly ended. This thereby suppresses a state arising in which the temperature of the cooling water falls accompanying the first de-icing control or the second de-icing control while the vehicle is parked for a short period of time, resulting in a drop in heating performance when the vehicle is used again after being parked for a short period of time.

Note that at step 190, there is no limitation to predicting the vehicle reuse period of time t based on whether or not the current location of the vehicle corresponds to the home address of the vehicle user and whether or not the current time corresponds to the nighttime. For example, the vehicle reuse period of time t may be predicted based on whether or not the current location of the vehicle corresponds to a place of work of the vehicle user, and whether or not the current time corresponds to a time before noon. In such cases, the vehicle reuse period of time t may be predicted to be a comparatively long period of time if the current location of the vehicle corresponds to the place of work of the vehicle user and the current time is a time before noon.

Moreover, a travel pattern of the vehicle may be stored by the vehicle user, and the vehicle reuse period of time t may be predicted based on the stored travel pattern, using at least one out of the out of a current location of the vehicle or a current time. There is a possibility that storing travel patterns of the vehicle and predicting the vehicle reuse period of time t based on the stored travel patterns may require a storage section with large capacity, as well as complex processing. Accordingly, storage of vehicle travel patterns and prediction of the vehicle reuse period of time t based on the stored travel patterns may be performed by a server/computer capable of communicating with the in-vehicle system.

The vehicle reuse period of time t may also be predicted based solely on the current location of the vehicle. For example, if the current location of the vehicle corresponds to a parking lot at a convenience store, supermarket, or the like, the vehicle reuse period of time t may be predicted to be a comparatively short period of time. Moreover, for example, if the current location of the vehicle corresponds to a destination that has been set using the navigation system 112, the vehicle reuse period of time t may be predicted to be a comparatively long period of time. Based on this, the vehicle reuse period of time t may be predicted based solely on the current location of the vehicle.

Note that in the explanation given above, the exterior heat exchanger 52 is disposed at the vehicle front of the radiator 32. However, the placement of the radiator 32 and the exterior heat exchanger 52 is not limited to that described above. For example, in cases in which the amount of waste heat from the engine 14 is low due to the engine 14 producing a low amount of exhaust gas, the size of the radiator 32 may be reduced. In such cases, as in the example of the vehicle heat management system 10D illustrated in FIG. 17, the radiator 32 and the exterior heat exchanger 52 may be arranged along the vehicle left-right direction inside the shielding duct 104.

Figure 17:
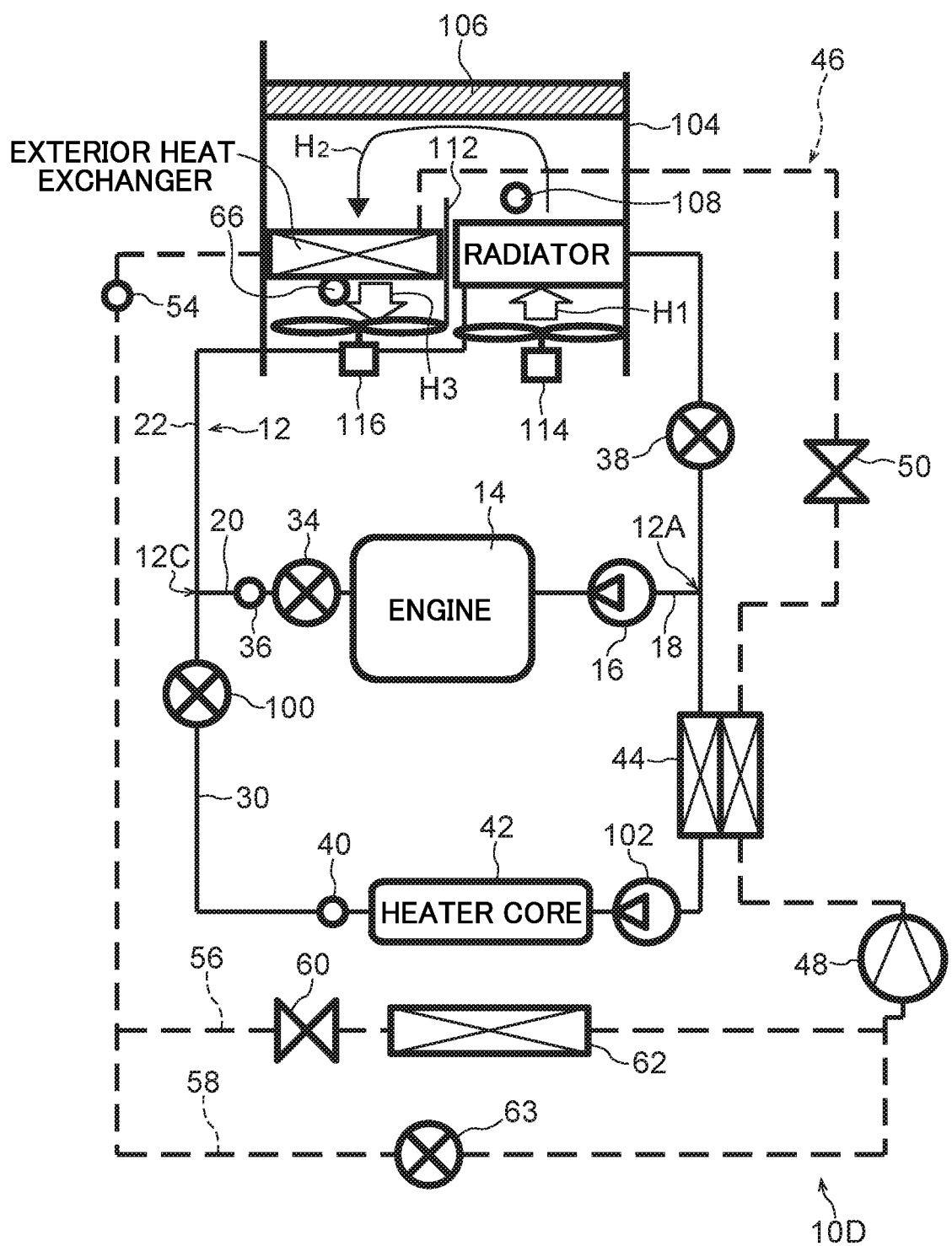
FIG. 17 is a schematic configuration diagram of a vehicle heat management system illustrating another example of a positional relationship between a radiator and an exterior heat exchanger.

In the example illustrated in FIG. 17, a shielding plate 112 partitions a space in which the radiator 32 is disposed from a space in which the exterior heat exchanger 52 is disposed inside the shielding duct 104. There is no opening provided in a side face of the shielding duct 104. An electric fan 114 is provided at the vehicle rear of the radiator 32, and an electric fan 116 is provided at the vehicle rear of the exterior heat exchanger 52. The electric fans 114, 116 are connected to the cooling water control ECU 72 through the electric fan driver 88. Note that the electric fans 114, 116 are also examples of air blowers of the present invention.

When performing de-icing of the exterior heat exchanger 52, the cooling water control ECU 72 uses the shutter driver 110 to close the shutter 106, such that the shutter 106 closes off the opening at the vehicle front of the shielding duct 104. The cooling water control ECU 72 also uses the electric fan driver 88 to rotate the electric fan 114 reversely, and rotate the electric fan 116 forward.

Accordingly, as illustrated by the arrow H1 in FIG. 17, air is blown from the vehicle rear toward the vehicle front through the radiator 32. Since the opening at the vehicle front of the shielding duct 104 is closed off by the shutter 106 and negative pressure is generated by rotating the electric fan 116 reversely, as illustrated by the arrow H2 in FIG. 17, the direction of blown air is redirected toward the rear of the vehicle inside the shielding duct 104. Moreover, as illustrated by the arrow H3 in FIG. 17, the blown air that has been redirected toward the rear of the vehicle passes through the exterior heat exchanger 52, thereby de-icing the exterior heat exchanger 52. Note that the placement of the radiator 32 and the exterior heat exchanger 52 illustrated in FIG. 17 may also be applied in the vehicle heat management systems 10A to 10C described above in the first exemplary embodiment to the fourth exemplary embodiment.

In the explanation given above, the engine 14 is used as an example of a heat generating body of the present invention. However, there is no limitation thereto, and the heat generating body may be configured by a battery of an electric vehicle, or may be configured by a fuel cell stack in a fuel cell vehicle.

Moreover, in the second exemplary embodiment onward, explanation has been given in which the third solenoid valve 100 serving as an example of a second switching section of the present invention is provided separately to the first solenoid valve 34 serving as an example of a first switching section of the present invention. However, there is no limitation thereto. For example, as illustrated in FIGS. 10, 14, and 17, if the pipe 26 bypassing the engine 14 is omitted, a three-way valve capable of switching the pipe 22 between a state in communication with the pipe 20 and a state in communication with the pipe 30 may be provided at the connection point 12C. In such cases, the three-way valve provided at the connection point 12C functions as an example of both the first switching section and the second switching section of the present invention.

A vehicle heat management device of a first aspect includes a first switching section, a pump, an air blower, and a de-icing controller. In a cooling water circulation path including a first flow path passing a heat generating body of a vehicle, and a second flow path passing a radiator and not passing the heat generating body, the first switching section is capable of switching between a state in which the first flow path and the second flow path are in communication with each other and a state in which the first flow path and the second flow path are isolated from each other. The pump circulates cooling water around the cooling water circulation path. The air blower blows air through the radiator toward an exterior heat exchanger of an air-conditioning device of the vehicle. In cases in which an estimated ice adhesion amount on the exterior heat exchanger is a predetermined value or greater, the de-icing controller starts first de-icing control by using the pump to circulate cooling water in a flow path including the second flow path in a state in which the first flow path and the second flow path are isolated from each other by the first switching section, and using the air blower to blow air through the radiator toward the exterior heat exchanger.

In the first de-icing control, cooling water is circulated in the flow path including the second flow path. This flow path passes the radiator, such that residual heat in the circulating cooling water is released through the radiator. The heat released through the radiator heats the air blown by the air blower, and this heated blown air is supplied to the exterior heat exchanger, thereby removing ice from the exterior heat exchanger. In this manner, in the first de-icing control, residual heat in the cooling water in the second flow path of the cooling water circulation path is used to de-ice the exterior heat exchanger, enabling de-icing to be performed even when the heat generating body of the vehicle is not generating heat. Moreover, in the first de-icing control, cooling water in the first flow path of the cooling water circulation path is not circulated, and so residual heat in this cooling water is not released through the radiator. This accordingly suppresses a fall in the temperature of the cooling water inside the first flow path and of the heat generating body, and improves energy utilization efficiency in cases in which the cooling water is subsequently raised to a predetermined temperature by the heat generation of the heat generating body. The first aspect thereby enables a drop in energy utilization efficiency to be suppressed when de-icing the exterior heat exchanger.

A second aspect is the first aspect, further including a water temperature detection section that detects a cooling water temperature in the second flow path. In the second aspect, after starting the first de-icing control and before determining de-icing of the exterior heat exchanger to be complete, in cases in which a cooling water temperature detected by the water temperature detection section is a predetermined value or lower, the de-icing controller performs second de-icing control by using the pump to circulate cooling water in a flow path including the first flow path and the second flow path in a state in which the first flow path and the second flow path have been placed in communication with each other by the first switching section, and using the air blower to blow air through the radiator toward the exterior heat exchanger.

In the second de-icing control, cooling water is circulated inside the flow path including the first flow path and the second flow path of the cooling water circulation path. This flow path passes the radiator, and so cooling water from the first flow path releases heat through the radiator. The heat released through the radiator heats the air blown by the air blower, and this heated blown air is supplied to the exterior heat exchanger, thereby removing ice from the exterior heat exchanger. Accordingly, in cases in which the residual heat of the cooling water inside the second flow path of the cooling water circulation path, utilized when de-icing by the first de-icing control, is insufficient to complete de-icing of the exterior heat exchanger on its own, residual heat of the cooling water in the first flow path can be utilized in order to continue de-icing.

A third aspect is the second aspect, further including a second switching section that is capable of switching between a state in which, in the second flow path, a first portion not including the radiator is in communication with a second portion including the radiator, and a state in which the first portion and the second portion are isolated from each other. In the third aspect, in the first de-icing control, the de-icing controller uses the second switching section to place the first portion and the second portion in communication with each other, and in the second de-icing control, the de-icing controller uses the second switching section to isolate the first portion and the second portion from each other.

The third aspect includes the second switching section that is capable of switching between a state in which the first portion of the second flow path not including the radiator is in communication with the second portion including the radiator, and a state in which the first portion and the second portion are isolated from each other. In the first de-icing control, the de-icing controller uses the second switching section to place the first portion and the second portion in communication with each other, and in the second de-icing control, the de-icing controller uses the second switching section to isolate the first portion and the second portion from each other. Accordingly, in the first de-icing control, cooling water inside the first portion of the second flow path is circulated through the radiator. In the second de-icing control performed after the water temperature of the cooling water in the first portion of the second flow path has fallen to the predetermined value or lower in the first de-icing control, the cooling water inside the first portion is not circulated. This thereby prevents a drop in de-icing efficiency caused by the temperature of the cooling water inside the first flow path that is circulated in the second de-icing control falling as a result of mixing with the cooling water inside the first portion of the second flow path in the second de-icing control. This enables de-icing of the exterior heat exchanger to be completed in a short period of time using the second de-icing control.

A fourth aspect is any aspect of the first aspect to the third aspect, further including an air temperature detection section that detects a temperature of air blown by the air blower. In the fourth aspect, the de-icing controller controls at least one of a circulation rate of cooling water by the pump or a flow rate of air blown by the air blower such that a temperature of blown air detected by the air temperature detection section becomes a predetermined value or greater.

In the fourth aspect, the temperature of the air blown by the air blower is detected by the air temperature detection section. The de-icing controller controls at least one out of the circulation rate of cooling water by the pump or the flow rate of air blown by the air blower such that the temperature of the blown air detected by the air temperature detection section becomes the predetermined value or greater. The temperature of the blown air supplied to the exterior heat exchanger therefore becomes the predetermined value or greater, enabling de-icing performance of the exterior heat exchanger to be improved, and enabling de-icing of the exterior heat exchanger to be completed in a short period of time.

A fifth aspect is any aspect of the first aspect to the fourth aspect, further including a shutter that is disposed further toward the front of the vehicle than the radiator and the exterior heat exchanger, and that is capable of switching between a state allowing passage of a flow of air and a state cutting off the flow of air. In the fifth aspect, the de-icing controller uses the shutter to cut off the flow of air while the de-icing controller is controlling de-icing of the exterior heat exchanger.

The fifth aspect includes the shutter that is disposed further toward the front of the vehicle than the radiator and the exterior heat exchanger, and that is capable of switching between a state allowing passage of a flow of air and a state cutting off the flow of air. Moreover, the de-icing controller uses the shutter to cut off the flow of air while the de-icing controller is controlling de-icing of the exterior heat exchanger. Accordingly, when de-icing of the exterior heat exchanger is performed while the vehicle is in motion, a flow of air that is not the air blown by the air blower, for example motion-induced wind, can be suppressed from passing through the radiator and the exterior heat exchanger and thereby causing a drop in the ability to de-ice the exterior heat exchanger.

A sixth aspect is any aspect of the first aspect to the fifth aspect, wherein the de-icing controller de-ices the exterior heat exchanger when the vehicle is stationary.

In the sixth aspect, de-icing of the exterior heat exchanger is performed when the vehicle is stationary. When the vehicle is stationary, the likelihood of the heat generating body of the vehicle requiring cooling is low, and the likelihood of residual heat in the cooling water in the cooling water circulation path being used for other purposes, such as heating, is also low. Accordingly, the cooling water in the cooling water circulation path can be employed exclusively for de-icing the exterior heat exchanger, thereby enabling stable de-icing of the exterior heat exchanger.

A seventh aspect is the sixth aspect, wherein the de-icing controller predicts a period of time from when the vehicle stops until the vehicle will be used again based on at least one out of location information of the vehicle or a time, and the de-icing controller does not de-ice the exterior heat exchanger in cases in which the predicted period of time is a predetermined period of time or shorter.

In the seventh aspect, the de-icing controller predicts the period of time from when the vehicle stops until the vehicle will be used again based on at least one out of the location information of the vehicle or the time. Moreover, the de-icing controller does not de-ice the exterior heat exchanger in cases in which the predicted period of time is the predetermined period of time or shorter. In the present invention, since residual heat in the cooling water is utilized to de-ice the exterior heat exchanger, the water temperature of the cooling water falls when de-icing the exterior heat exchanger. However, in the seventh aspect, de-icing of the exterior heat exchanger is not performed in cases in which it has been predicted that the vehicle will be used again within the predetermined period of time. Accordingly, a drop in heating performance caused by a fall in the temperature of the cooling water can be avoided in cases in which the vehicle is used again within the predetermined period of time.

The present invention exhibits the advantageous effect of enabling a drop in energy utilization efficiency to be suppressed when de-icing the exterior heat exchanger.

What is claimed is:

1. A vehicle heat management device, comprising:
a first valve that, in a cooling water circulation path including (i) a first flow path passing a heat generating body of a vehicle and (ii) a second flow path passing a radiator and not passing the heat generating body, is switchable between a state in which the first flow path and the second flow path are in communication with each other and a state in which the first flow path and the second flow path are isolated from each other;
a pump that circulates cooling water around the cooling water circulation path;
a fan that blows air through the radiator toward an exterior heat exchanger of an air-conditioning device of the vehicle; and
a processor that is configured to, in a case in which an estimated ice adhesion amount on the exterior heat exchanger is a predetermined value or greater, start first de-icing control by (i) using the pump to circulate cooling water in a flow path including the second flow path in the state in which the first flow path and the second flow path are isolated from each other by the first valve and (ii) using the fan to blow air through the radiator toward the exterior heat exchanger.

2. The vehicle heat management device of claim 1, further comprising a water temperature sensor that detects a cooling water temperature in the second flow path,
wherein, after starting the first de-icing control and before determining de-icing of the exterior heat exchanger to be complete, in a case in which a cooling water temperature detected by the water temperature sensor is a predetermined value or lower, the processor is configured to perform second de-icing control by (i) using the pump to circulate cooling water in a flow path including the first flow path and the second flow path in the state in which the first flow path and the second flow path have been placed in communication with each other by the first valve and (ii) using the fan to blow air through the radiator toward the exterior heat exchanger.

3. The vehicle heat management device of claim 2, further comprising a second valve that is switchable between (i) a state in which a first portion of the second flow path not including the radiator is in communication with a second portion of the second flow path including the radiator and (ii) a state in which the first portion and the second portion are isolated from each other,
wherein, in the first de-icing control, the processor is configured to use the second valve to place the first portion and the second portion in communication with each other, and in the second de-icing control, the processor is configured to use the second valve to isolate the first portion and the second portion from each other.

4. The vehicle heat management device of claim 1, further comprising an air temperature sensor that detects a temperature of air blown by the fan,
wherein the processor is configured to control one or both of a circulation rate of cooling water by the pump and a flow rate of air blown by the fan such that a temperature of blown air detected by the air temperature sensor becomes a predetermined value or greater.

5. The vehicle heat management device of claim 1, further comprising a shutter that is disposed further toward a front of the vehicle than the radiator and the exterior heat exchanger and that is switchable between a state allowing passage of a flow of air and a state cutting off the flow of air,
wherein the processor is configured to use the shutter to cut off the flow of air while the processor is controlling de-icing of the exterior heat exchanger.

6. The vehicle heat management device of claim 1, wherein the processor is configured to de-ice the exterior heat exchanger in a case in which the vehicle is stationary.

7. The vehicle heat management device of claim 6, wherein the processor is configured to predict a period of time from when the vehicle stops until the vehicle will be used again based on one or both of location information of the vehicle and a time of day, and the processor is configured not to de-ice the exterior heat exchanger in a case in which the predicted period of time is a predetermined period of time or shorter.

8. A non-transitory recording medium storing a program to cause a computer to execute processing, the processing comprising:
in a case in which an estimated ice adhesion amount on an exterior heat exchanger of an air-conditioning device of a vehicle is a predetermined value or greater, in a cooling water circulation path including a first flow path passing a heat generating body of a vehicle and a second flow path passing a radiator and not passing the heat generating body, starting first de-icing control by:
(i) using a pump that circulates cooling water around the cooling water circulation path to circulate cooling water in a flow path including the second flow path in a state in which the first flow path and the second flow path are isolated from each other by a first valve that is switchable between a state in which the first flow path and the second flow path are in communication with each other and the state in which the first flow path and the second flow path are isolated from each other, and
(ii) using a fan to blow air through the radiator toward the exterior heat exchanger.

9. The non-transitory recording medium of claim 8, wherein the processing further comprises:
after starting the first de-icing control and before determining de-icing of the exterior heat exchanger to be complete, in a case in which a cooling water temperature detected by a water temperature sensor that detects a cooling water temperature in the second flow path is a predetermined value or lower, performing second de-icing control by (i) using the pump to circulate cooling water in a flow path including the first flow path and the second flow path in the state in which the first flow path and the second flow path have been placed in communication with each other by the first valve, and (ii) using the fan to blow air through the radiator toward the exterior heat exchanger.

10. The non-transitory recording medium of claim 9, wherein the processing further comprises:
in the first de-icing control, using a second valve that is switchable between a state in which a first portion of the second flow path not including the radiator is in communication with a second portion of the second flow path including the radiator, and a state in which the first portion and the second portion are isolated from each other, to place the first portion and the second portion in communication with each other, and
in the second de-icing control, using the second valve to isolate the first portion and the second portion from each other.

11. The non-transitory recording medium of claim 8, wherein the processing further comprises:
controlling one or both of a circulation rate of cooling water by the pump and a flow rate of air blown by the fan such that a temperature of blown air detected by an air temperature sensor that detects a temperature of air blown by the fan becomes a predetermined value or greater.

12. The non-transitory recording medium of claim 8, wherein the processing further comprises:
using a shutter that is disposed further toward a front of the vehicle than the radiator and the exterior heat exchanger, and that is switchable between a state allowing passage of a flow of air and a state cutting off the flow of air, to cut off the flow of air while controlling de-icing of the exterior heat exchanger.

13. The non-transitory recording medium of claim 8, wherein the processing further comprises:
de-icing the exterior heat exchanger in a case in which the vehicle is stationary.

14. The non-transitory recording medium of claim 13, wherein the processing further comprises:
predicting a period of time from when the vehicle stops until the vehicle will be used again based on one or both of location information of the vehicle and a time of day, and not de-icing the exterior heat exchanger in a case in which the predicted period of time is a predetermined period of time or shorter.

\* \* \* \* \*